US012624806B1

(12) United States Patent
Rezek et al.

(10) Patent No.: US 12,624,806 B1
(45) Date of Patent: May 12, 2026

(54) MODULAR LIGHT FIXTURE WITH AT LEAST TWO LIGHT BOARDS

(71) Applicant: Rezek Engineering, San Bernardino, CA (US)

(72) Inventors: Ronald Rezek, San Bernardino, CA (US); Tyler Hayhurst, Chino, CA (US)

(*) Notice: Subject to any disclaimer, the term of this patent is extended or adjusted under 35 U.S.C. 154(b) by 0 days.

(21) Appl. No.: 18/943,486

(22) Filed: Nov. 11, 2024

(51) Int. Cl.

| | |
|---|---|
| ***F21S 2/00*** | (2016.01) |
| ***F21V 3/02*** | (2006.01) |
| ***F21V 15/02*** | (2006.01) |
| ***F21V 19/00*** | (2006.01) |
| ***F21V 23/06*** | (2006.01) |
| ***F21V 29/67*** | (2015.01) |
| ***F21V 29/74*** | (2015.01) |
| *F21Y 115/10* | (2016.01) |

(52) U.S. Cl.
CPC .............. *F21S 2/005* (2013.01); *F21V 3/026* (2013.01); *F21V 15/02* (2013.01); *F21V 19/003* (2013.01); *F21V 23/06* (2013.01); *F21V 29/673* (2015.01); *F21V 29/74* (2015.01); *F21Y 2115/10* (2016.08)

(58) Field of Classification Search
CPC ....... F21S 2/005; F21L 14/023; F21V 19/003; F21V 23/06; F21V 21/14; F21V 21/22
See application file for complete search history.

(56) References Cited

U.S. PATENT DOCUMENTS

| | | | | |
|---|---|---|---|---|
| 3,610,916 A * | 10/1971 | Meehan | F21V 33/008 | 446/485 |
| 7,234,847 B2 * | 6/2007 | Yoshimori | E04H 12/182 | 362/418 |
| 7,246,913 B2 * | 7/2007 | Ossolinski | B60P 3/18 | 362/363 |
| 7,252,414 B2 * | 8/2007 | Chabert | F21V 3/023 | 362/394 |
| 7,264,382 B2 * | 9/2007 | Yoshimori | B60P 3/18 | 362/431 |
| 7,320,529 B2 * | 1/2008 | Goh | F21V 3/023 | 362/189 |
| 7,824,079 B2 * | 11/2010 | Cuppett | F21L 14/04 | 362/450 |
| 8,613,527 B1 * | 12/2013 | Allen | F21V 3/026 | 362/234 |
| 9,364,113 B2 * | 6/2016 | Gary | G09F 19/02 | |
| 9,377,172 B2 | 6/2016 | Chabert | | |
| 11,287,103 B2 * | 3/2022 | Palumbo | F21V 3/026 | |
| 12,072,608 B2 * | 8/2024 | Li | F21V 17/06 | |
| 2005/0185410 A1 * | 8/2005 | Liao | F21V 1/06 | 362/352 |
| 2008/0158904 A1 * | 7/2008 | Lai | F21S 6/005 | 362/382 |

FOREIGN PATENT DOCUMENTS

WO WO2022106109 A1 5/2022

* cited by examiner

*Primary Examiner* — Ismael Negron
(74) *Attorney, Agent, or Firm* — Advantage IP Law Firm

(57) ABSTRACT

A modular light fixture including a support tower, a plurality of lighting tiers defined by the support tower, one or more light boards, and one or more placeholder blanks. The light boards and placeholder blanks configured to be selectively coupled to the support tower within the lighting tiers to vary the brightness capacity of the light providing alternative lighting characteristics.

20 Claims, 25 Drawing Sheets

MODULAR LIGHT FIXTURE WITH AT LEAST TWO LIGHT BOARDS

FIELD OF THE DISCLOSURE

The disclosure relates generally to the field of light fixtures and, more particularly, to modular light fixtures capable of altering their illumination output.

BACKGROUND OF THE DISCLOSURE

A variety of light fixtures and lighting elements abound, some with more general applications and others with more specific applications. In both indoor and outdoor lighting environments, the wattage capacity and relative light emitted are typically altered by swapping out a light bulb with a higher or lower wattage rating. For example, the wattage rating of many indoor lamps may be increased by exchanging an incandescent bulb for an incandescent bulb with a higher wattage rating. Likewise, the brightness of the light fixture may be increased by increasing the total amount of lumens being produced.

In recent years, light bulbs have gotten better in terms of design and efficiency with incandescent bulbs giving way to one or more light emitting diodes (LEDs) in many instances. Even with LEDs being more efficient than incandescent bulbs resulting in more lumens per watt, lower heat output, and longer lifespans, there are scenarios wherein altering the wattage capacity of a light fixture may be desired.

A particular light fixture construction includes an inflatable balloon surrounding a light tower. The degree of opacity of the balloon material, ranging from fully transparent to practically opaque, determines how the light emitted from the light tower is diffused. The lighting needs, where the light fixtures or lamps with a fixed wattage or brightness rating are to be placed, dictates the number of lamps needed to support the lighting needs. However, this is limiting in that multiple power sources may be needed and the lamps take up a certain amount of space.

While the foregoing approaches generally describe conventional light fixtures usable with an inflatable diffuser element, there remains a need for a light fixture having the capability of altering its wattage and/or lumen capacity through a modular substitution system.

SUMMARY

In accordance with at least one embodiment disclosed herein, a modular light fixture may be provided with a light board support tower with a base level lighting tier having at least one light emitting board releasably secured to the light board support tower and defining a first brightness capacity and at least one auxiliary level lighting tier having at least one auxiliary light emitting board releasably secured to the light board support tower, the light emitting boards being coupled in series to define a second brightness capacity, and further comprising a driver unit constructed to control the lighting emitting boards and an auxiliary connector removably coupling the base level lighting tier to the driver unit wherein a power source may be coupled to the driver unit to illuminate the coupled light emitting boards.

In at least one embodiment, the support tower of the modular light fixture includes a set of support pillars providing multiple mounting surfaces for a set of light boards.

In at least one exemplary embodiment described herein, the modular light fixture includes a protective cage covering the support tower and light boards, a fan for drawing air into the interior of the support tower, and a diffuser element at least partially surrounding the protective cage with the fan operating to both assist in cooling the light boards and inflating the diffuser.

In another exemplary embodiment, the light boards across multiple lighting tiers are removably coupled to the support tower and arranged in a vertical alignment and coupled in series.

In yet another exemplary embodiment, one or more lighting tiers may incorporate one or more placeholder blanks to fill a space along the height of the support tower and assist in sealing off an interior space of the support tower when a light board is not being used, the placeholder blanks being swappable with light boards to vary the brightness capacity of the modular light tower.

Methods of assembling and using the modular balloon light fixture are also disclosed herein.

All of the embodiments summarized above are intended to be within the scope of the invention herein disclosed. However, despite the discussion of certain embodiments herein, only the appended claims (and not the present summary) are intended to define the invention. The summarized embodiments, and other embodiments and aspects of the present invention, will become readily apparent to those skilled in the art from the following detailed description of the preferred embodiments having reference to the attached figures of the preferred embodiments, which are intended to illustrate and not limit the present disclosure, the invention not being limited to any particular embodiment(s) disclosed.

DETAILED DESCRIPTION OF THE PREFERRED EMBODIMENTS

Figure 1:
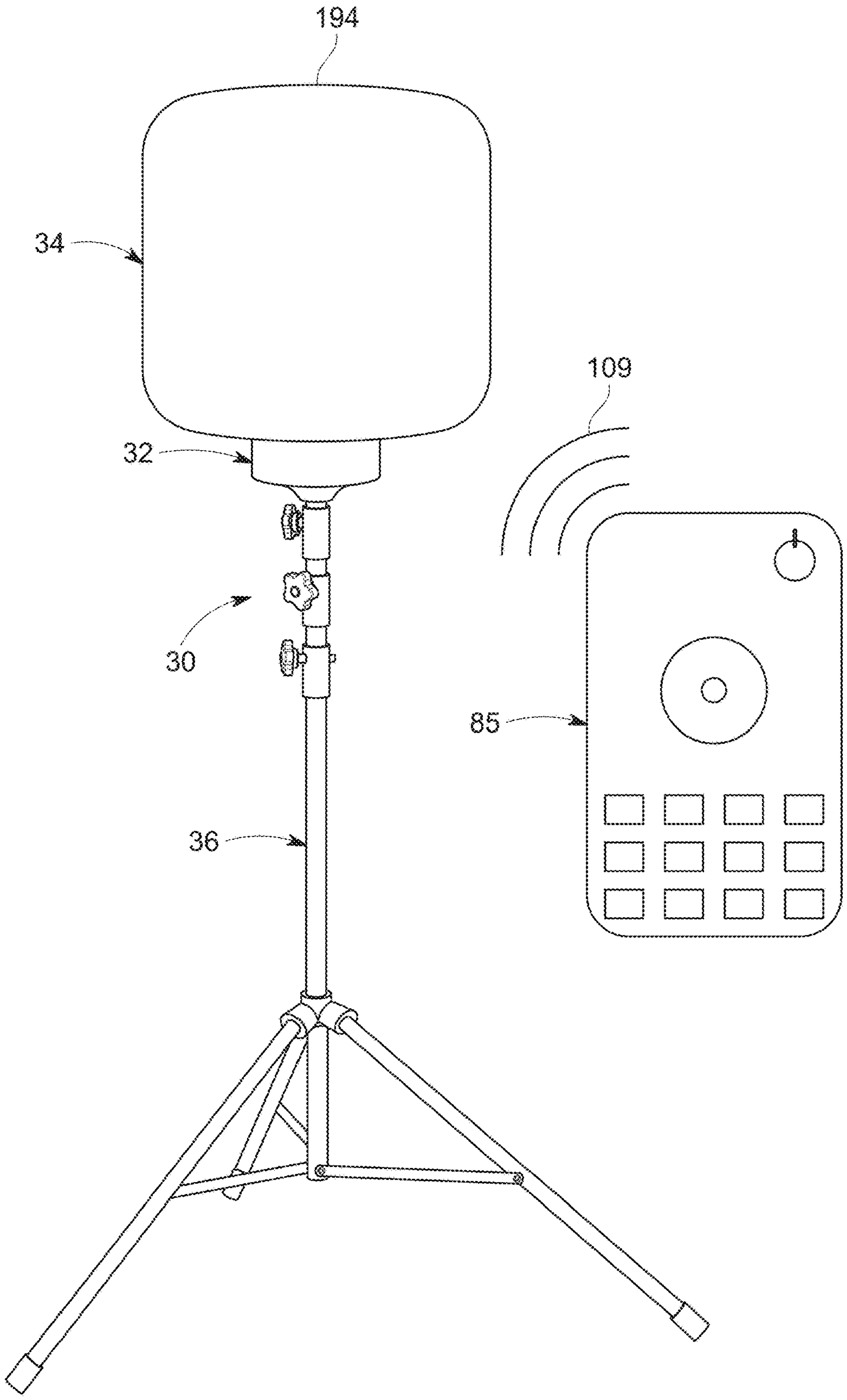
FIG. 1 is a front view of an exemplary first embodiment of a modular light fixture assembly mounted on a tripod light stand and including an inflatable diffuser and an exemplary remote control device as constructed in accordance with the present disclosure.

Referring initially to FIG. 1, an exemplary modular light fixture system, generally designated 30, is depicted with a modular light fixture or light fixture assembly, generally designated 32, partially surrounded by an inflatable diffuser, generally designated 34, as mounted on an exemplary tripod mounting structure, generally designated 36. It will be appreciated that the exemplary modular light fixture system may be supported by a tripod as shown in FIG. 1, by a single post, or alternatively suspended from a cable or other overhead support or from a laterally projecting support. In other words, the tripod mount is just one exemplary support structure for holding or suspending the modular light fixture assembly with or without an inflatable diffuser. In addition, the light fixture systems may be used as a standalone light source or used in connection with additional modular light fixture systems as a combined light source.

Figure 2:
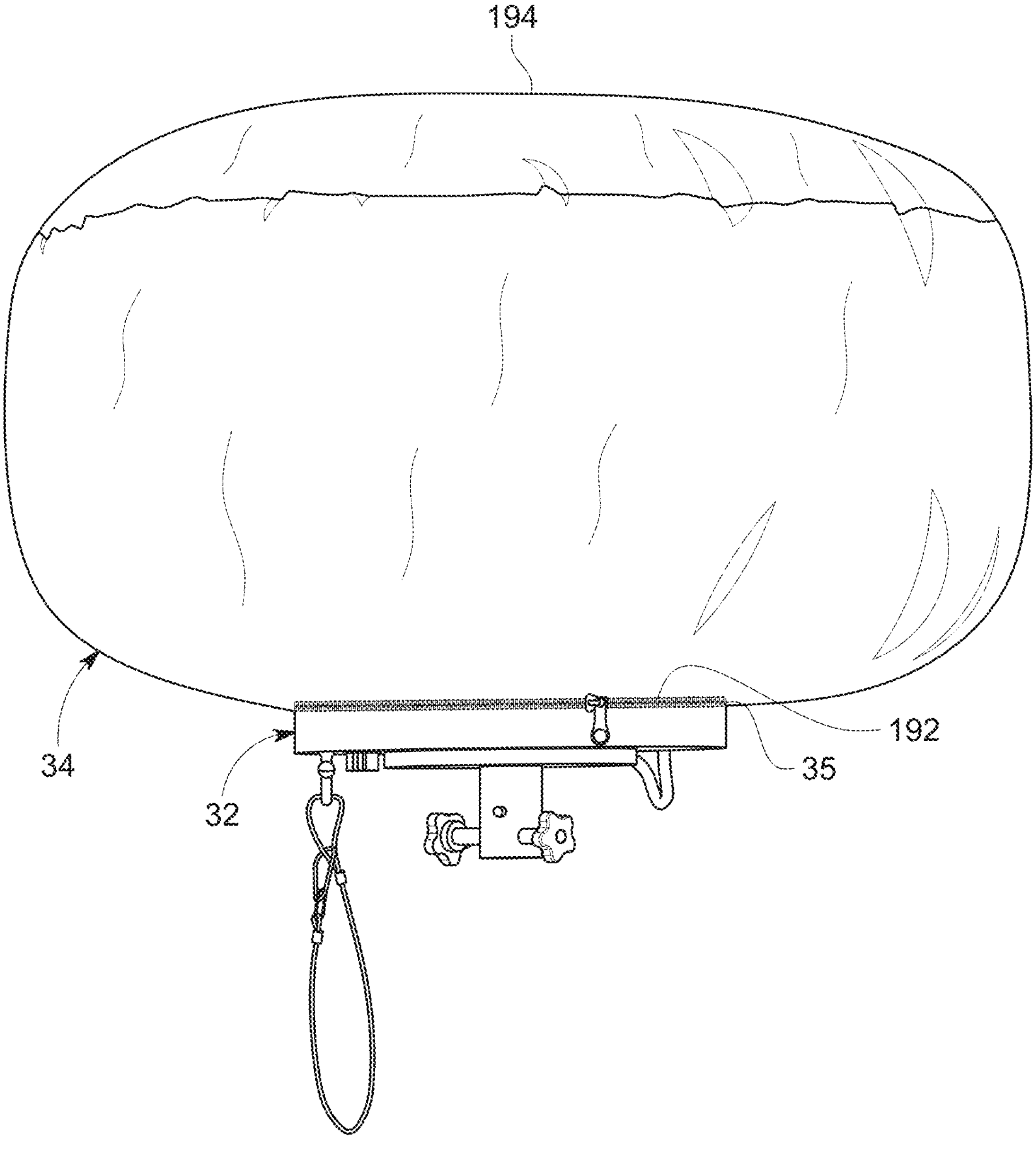
FIG. 2 is a front view of the modular light fixture assembly and inflatable diffuser of FIG. 1 without the tripod light stand, in enlarged scale.

Turning to FIG. 2, a closeup of an exposed lower section of the light fixture assembly 32 is shown extending through the bottom opening of an inflatable diffuser 34 that surrounds the remainder of the light fixture assembly components positioned inside the inflatable diffuser. In general, the inflatable diffuser 34 effectively surrounds the light fixture assembly 32 which contains one or more light boards for emitting light that passes through the skin of the diffuser, which may have a selected opacity, as will be discussed in more detail below. A circumferential zipper 35 is provided to allow the lower end of the diffuser to open sufficiently to slip over and enclose a circumferential lower portion of the light fixture 32 with most of the light fixture assembly disposed within the diffuser.

Continuing on with FIGS. 3-7, the assembled components of a first embodiment of an exemplary modular light fixture assembly 32 that may be used with the diffuser 34 and supported or suspended in a position to emit light will now be discussed. The primary components of the modular light fixture assembly include a lower housing 40, a light board support tower 42 projecting from the lower housing, a protective cage 44 at least partially surrounding the light board support tower, and a diffuser bracket 46 positioned atop the protective cage for securing one end of the diffuser 34 (FIGS. 1-2).

With ongoing reference to FIGS. 3-7, 9 and 10A, the lower housing 40 includes a variety of components contributing to the mounting, power, and lighting options for the modular light fixture assembly 32. In this exemplary embodiment, the lower housing 40 is a cylindrical, partially hollow structure that includes a bottom surface 47 for securing a sponge pressing plate 48 into which a filtering sponge 50 is disposed. The sponge pressing plate includes a set of spaced apart vent openings 51 that define inlets (in the direction of airflow) directed toward the lower surface of the filtering sponge. Both the filtering sponge and the sponge pressing plate include their own respective central circular openings 52 and 53. With the filtering sponge 50 nested inside the sponge pressing plate, the sponge pressing plate 48 may be secured to the bottom surface 47 of the lower housing 40 using a suitable fastener.

Abutting the lower surface 54 of the sponge pressing plate around the periphery of a central aperture 53 is a circular mounting collar 58 with a hollow lower opening 60 for receiving a complementary cylindrical top end of the mounting structure, such as the mounting tripod 36 in FIG. 1. The mounting collar may be further secured to the top end of the mounting structure 36 to using a pair of bolt fasteners 62*a*, 62*b* passing through the sidewall of the mounting collar and including flower shaped handles, respectively. The bolts that may be used as set screws or pass through a corresponding set of threaded holes in the top end of the mounting structure 36.

Further projecting through the sidewall of the mounting collar 58 is a quick release safety pin 66 that inhibits release of the lower housing 40 from the mounting structure 36 until removed. The safety pin 66 provides a safety backup in case the two bolts 62*a*,62*b* loosen over time. Another safety feature is provided in the form of a safety rope or cable 68 includes a first loop 70 attached to an anchor point 72 (FIGS. 3-4) secured to the bottom surface 47 of the lower housing. The opposing loop end 74 of the safety cable includes a carabiner 76 for quickly securing the opposing end 74 of the cable to a vent or truss such as when the housing 40 is suspended from such structure. The safety cable acts as another viable backup if the threaded bolts 62*a*, 62*b* loosen over time. The bottom surface 47 of the lower housing also includes a toggle on-off switch 78 and an electrical cable input port 80 for attaching to a power supply cable 82. There is also a dimming control knob 84 provided for dimming control with settings of 25% of max, 50% of max, 75% of max, 100% (max) and a Remote Active setting for rendering the light fixture system 30 receptive to a remote signal from a remote control device 85 (FIG. 1). In addition, the bottom surface 47 of the lower housing has a set of apertures 101 complementary to the openings 51 in the sponge pressing plate 48 to ensure airflow is directed through the bottom of the lower housing into the interior of the light fixture assembly 32.

Figure 3:
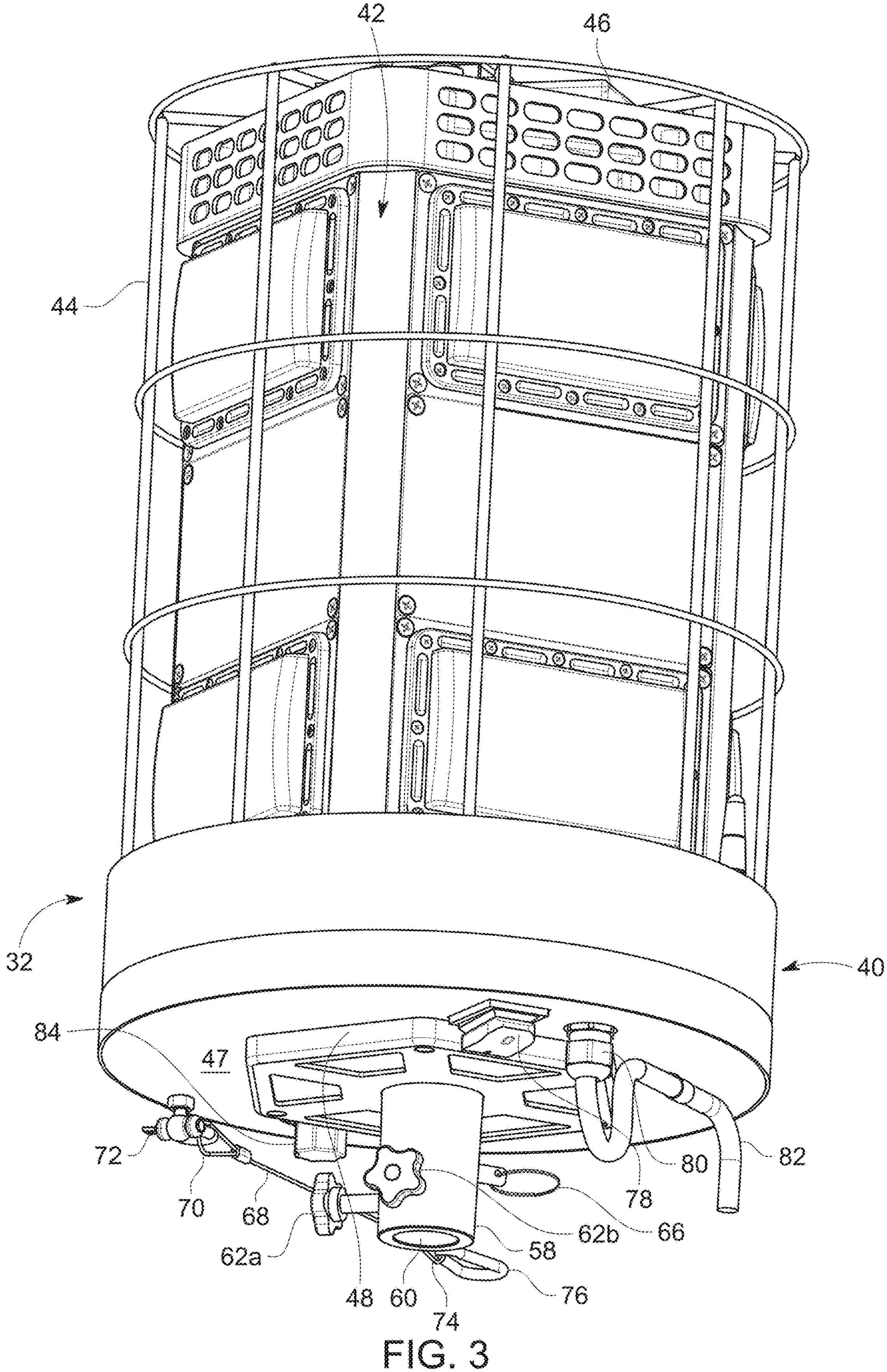
FIG. 3 is a perspective view of an exemplary first embodiment of the modular light fixture assembly of FIG. 1 without the tripod light stand or inflatable diffuser, in enlarged scale.
Figure 4:
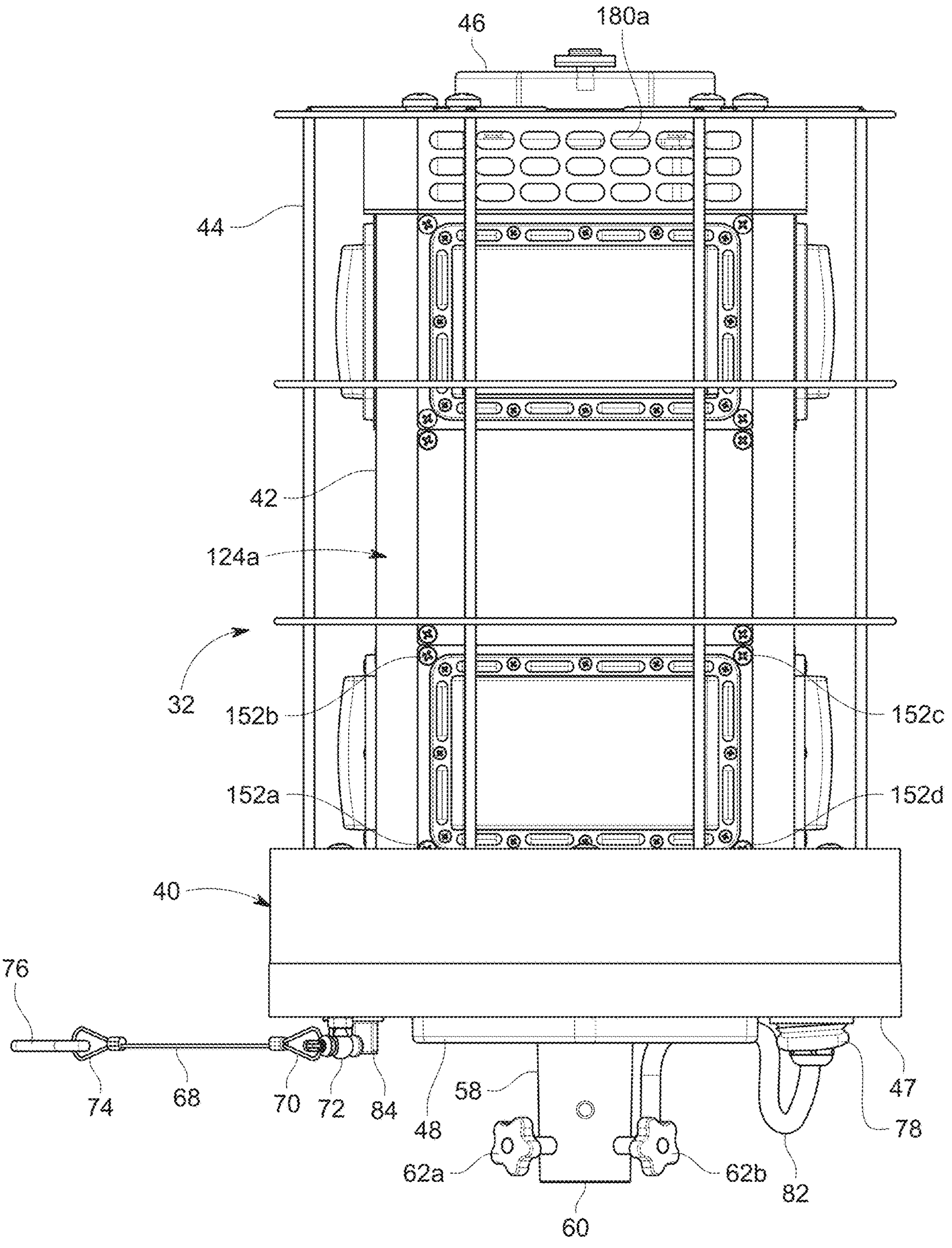
FIG. 4 is a front view of the light fixture assembly of FIG. 3.
Figure 5:
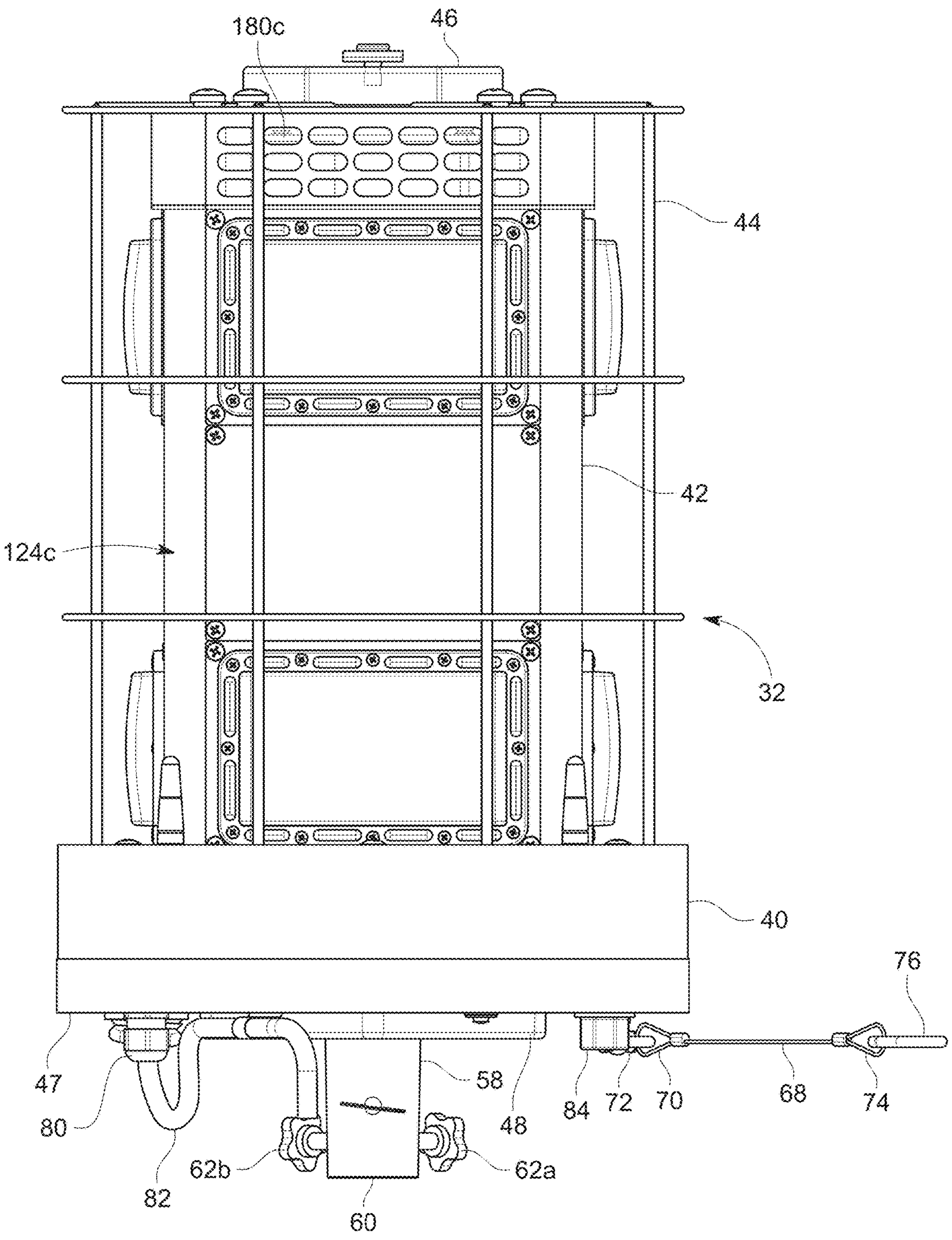
FIG. 5 is a rear view of the light fixture assembly of FIG. 3.
Figure 6:
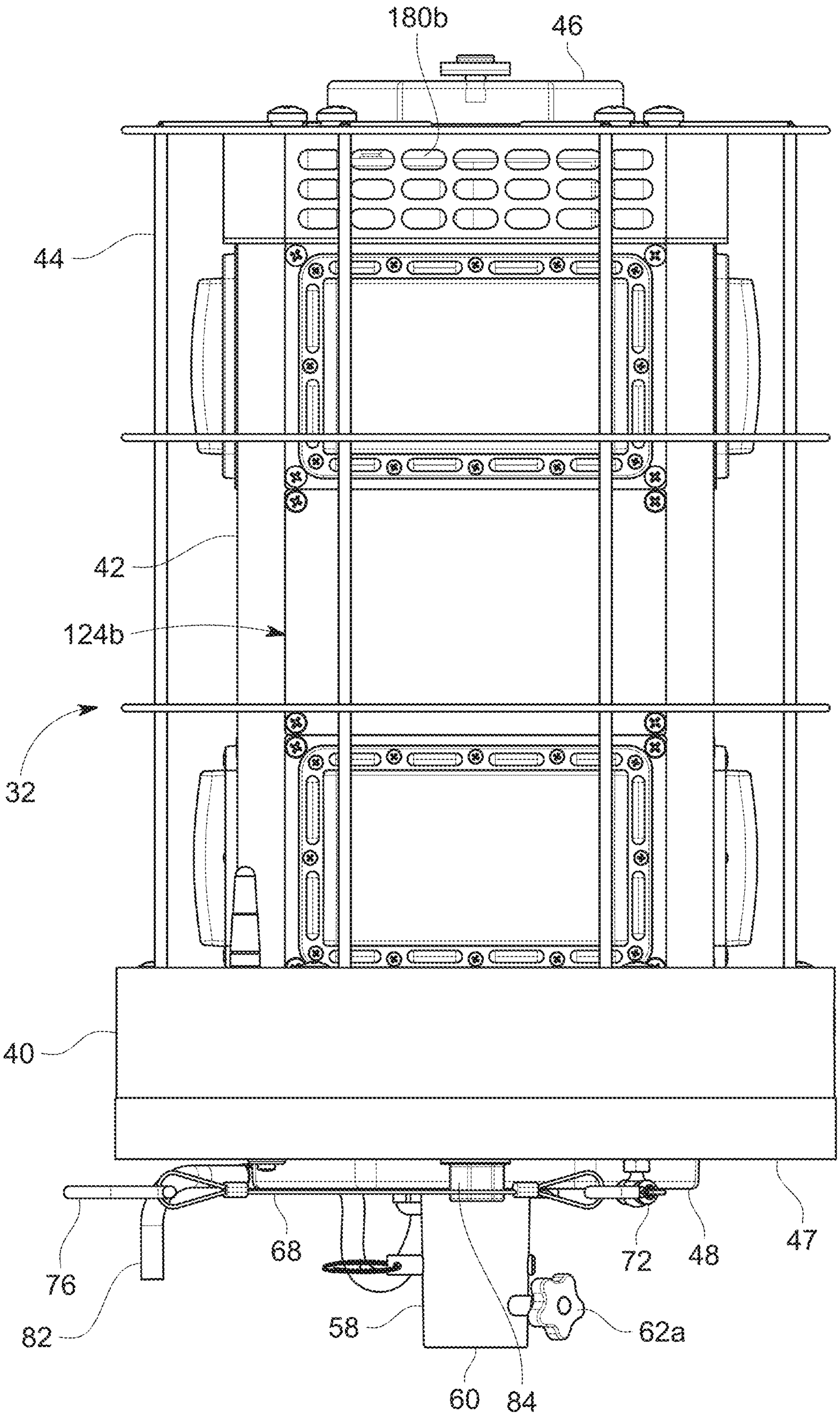
FIG. 6 is a left side view of the light fixture assembly of FIG. 3.
Figure 7:
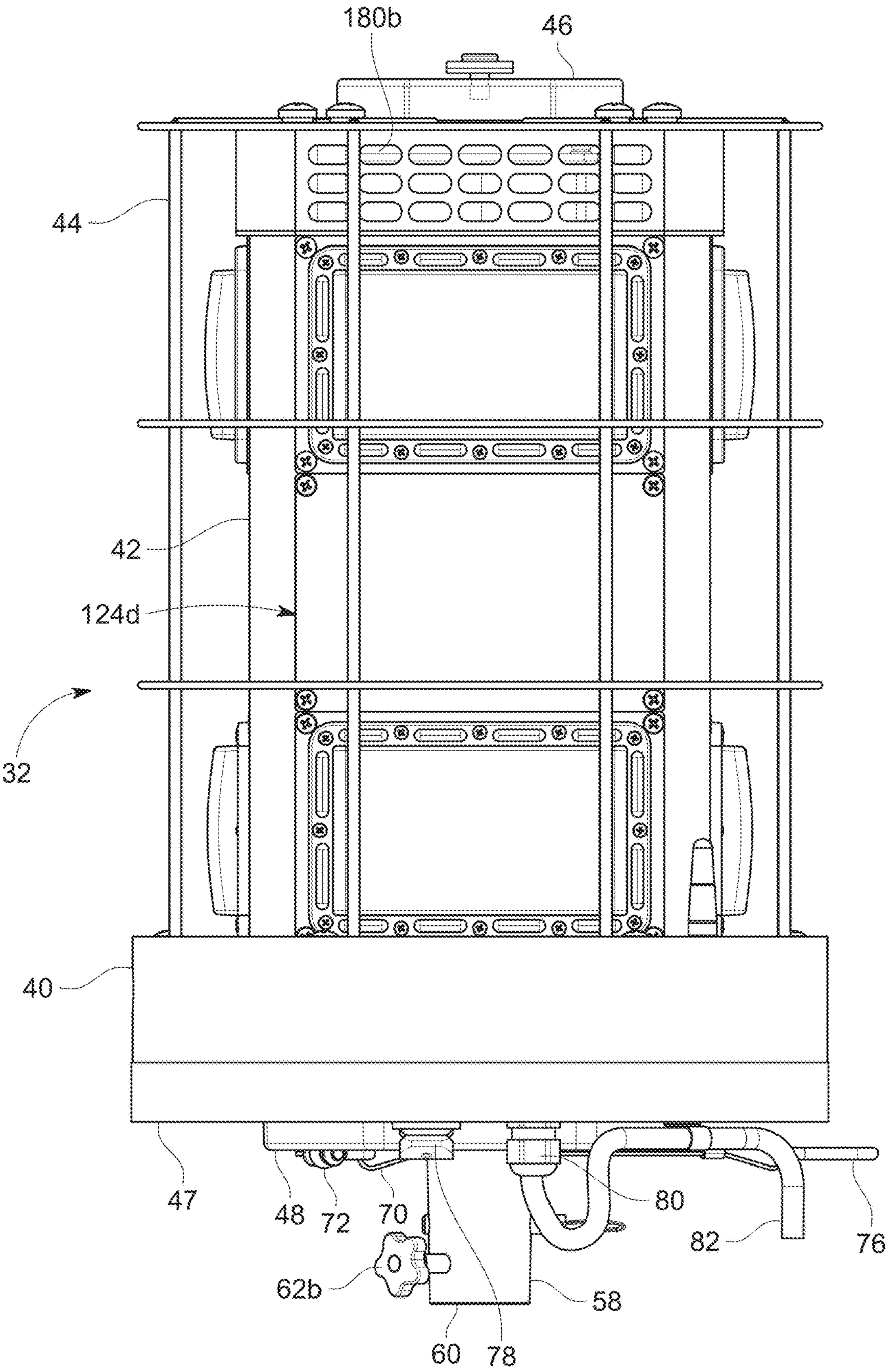
FIG. 7 is a right side view of the light fixture assembly of FIG. 3.
Figure 9:
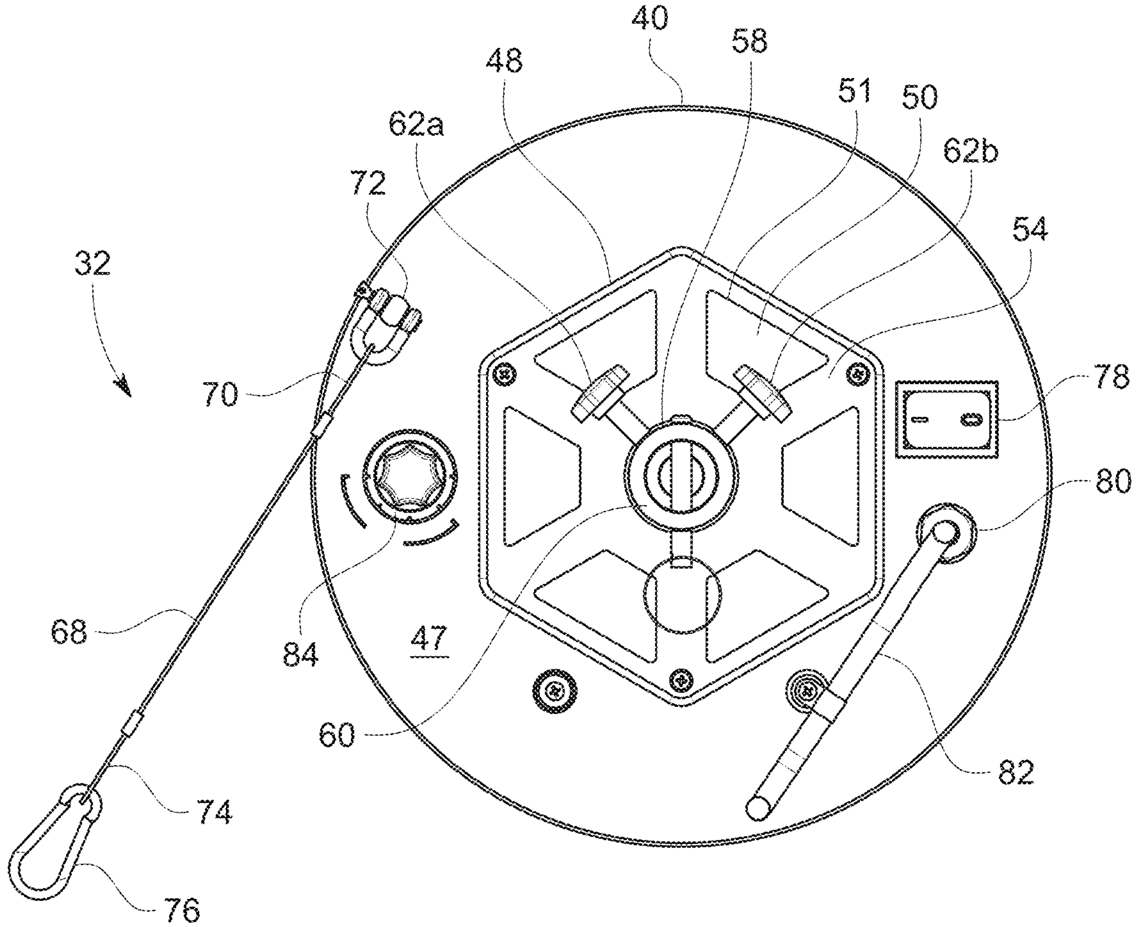
FIG. 9 is a bottom view of the light fixture assembly of FIG. 3.

With continued reference to FIGS. 3-7, 9, 10A, and 11, within the upwardly facing hollow recess 86 (FIG. 10A) of the lower housing 40 are disposed several components for powering on the light fixture assembly 32 as will be discussed below. The main components are a knob box 88, a switch box 90, and an LED driver 92. The knob box 88 contains the dimming control knob 84 which projects through the bottom surface 47 of the lower housing as best shown in FIGS. 3, 5, and 9. The switch box 90 contains the toggle on-off switch 78 (FIGS. 3 and 9) and a power cable interface for communication with the power supply cable 82. The LED driver 92 nests on the interior bottom surface 94 of the lower housing 40 and includes connections for a lighting output cable 96, dimming controller cable 98, and a fan power cable 100.

Figure 10A:
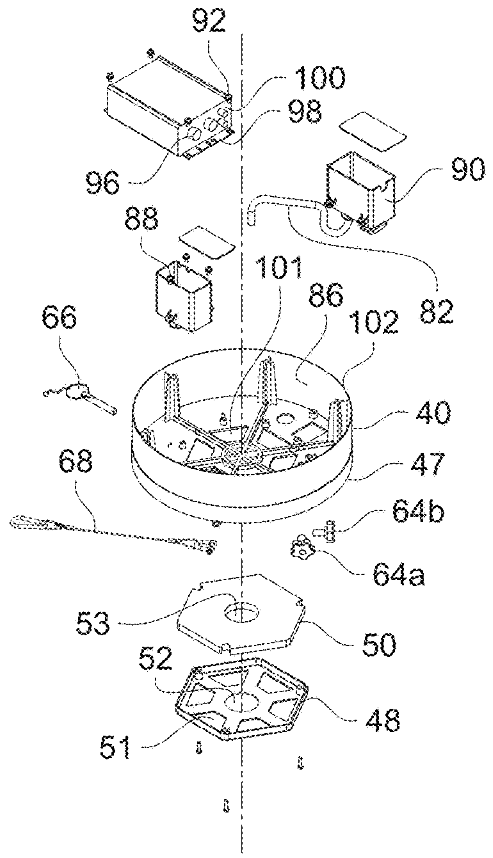
FIG. 10A is a lower portion of an exploded view of the light fixture assembly of FIG. 3, in reduced scale.
Figure 10B:
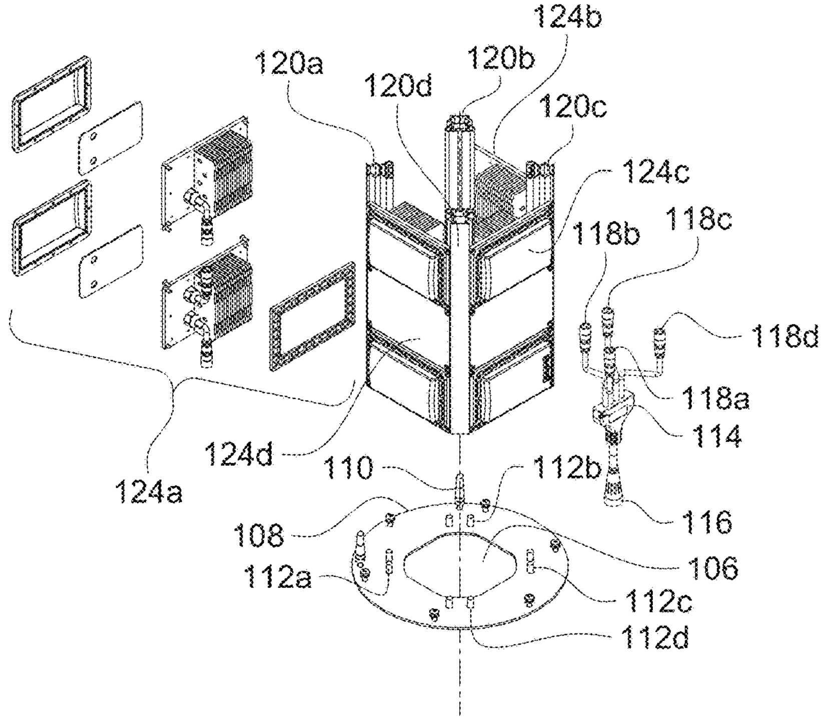
FIG. 10B is an intermediate portion of an exploded view of the light fixture assembly of FIG. 3, in reduced scale.

Turning now to FIGS. 10A-10B, resting atop and secured to a set of spaced apart peripheral support posts projecting along the sidewall of the lower housing 40 toward the upper rim 102 of the lower housing 40 is a circular lamp fixture mounting plate 104 with a central square opening 106 with rounded corners allowing for passthrough of cables coming from the lower housing 40. The upper surface 108 of the lamp fixture mounting plate includes one or more antennas 110 for receiving wireless signals 109 from a remote unit 85 (FIG. 1). Disposed near the four rounded corners of the central square opening and projecting upwardly from the upper surface 108 of the lamp fixture mounting plate 104 are four sets of dual mounting stubs 112*a*-*d* which will be used for aligning and securing the bottom ends of a set of four support pillars 120*a*-*d* discussed below. Connecting the LED driver 92 to the light boards discussed below is a Y-splitter 114. In this exemplary embodiment, the Y-splitter is a one to four configuration with the input end 116 passing through the central square opening 106 and plugging into the lighting output cable (or port) 96 of the LED driver 92. The Y-splitter then splits into four output end cables 118*a*-*d* in this example to accommodate the four-sided light board support tower discussed below.

Figure 10C:
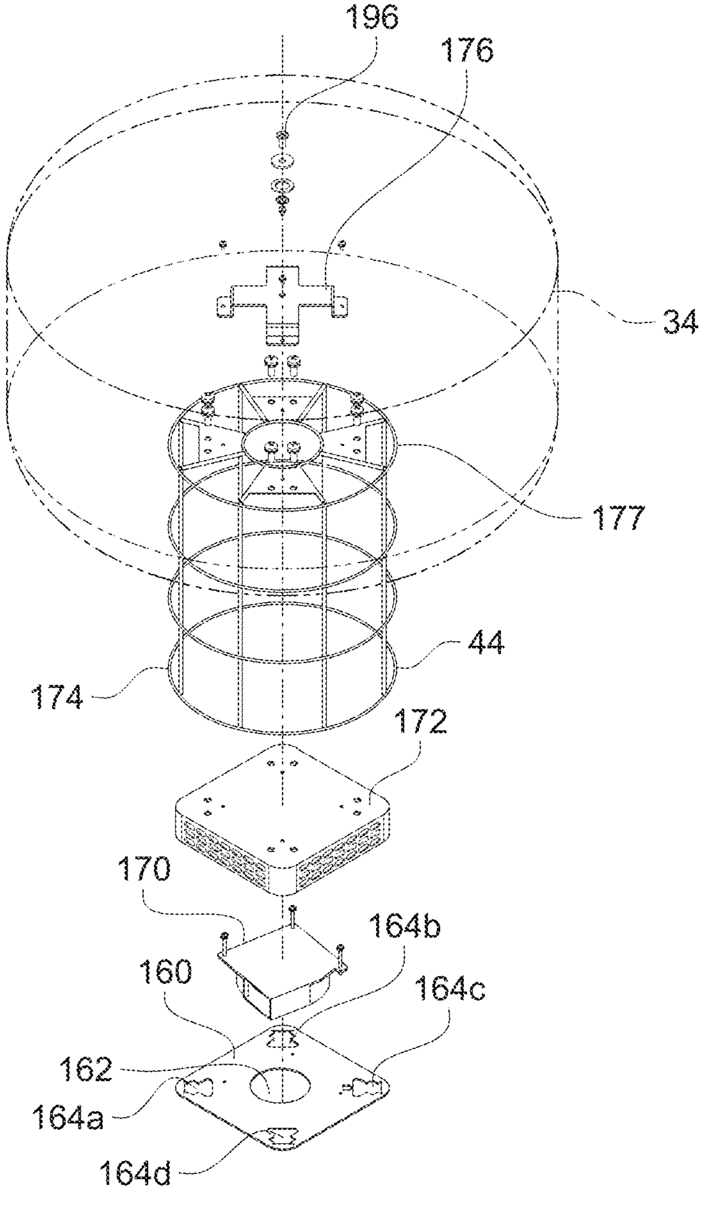
FIG. 10C is an upper portion of an exploded view of the light fixture assembly of FIG. 3, in reduced scale, and with the inflated diffuser in dashed lines for environmental purposes.
Figure 11:
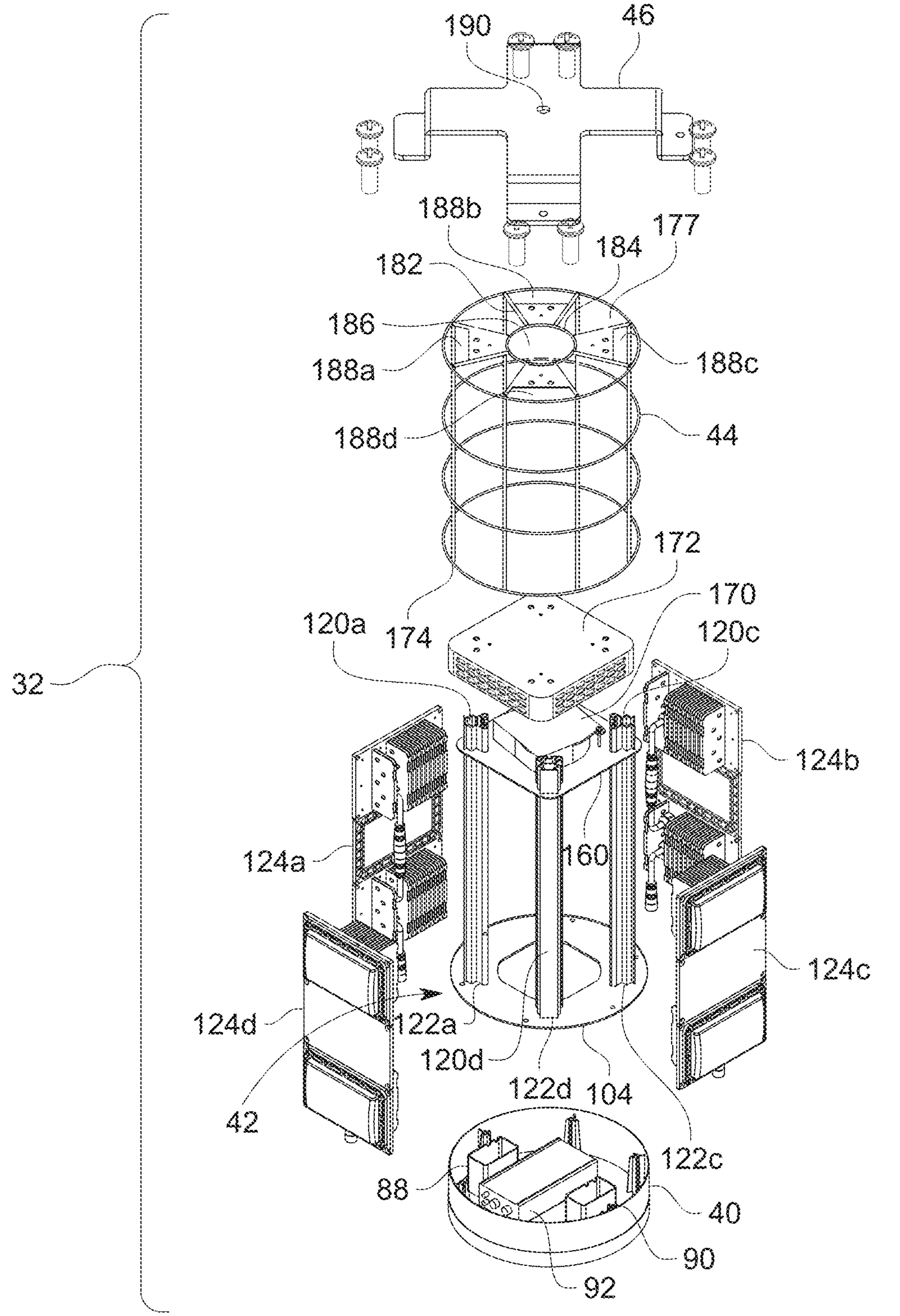
FIG. 11 is a partially exploded view of an exemplary light fixture assembly of FIG. 3 depicting a lower housing, a support tower with light board stacks, a fan and a fan covering, a protective cage, and a diffuser bracket, in reduced scale.

With continued reference to FIGS. 10B-10C and 11, the modular light fixture assembly 32 includes a light board support tower, generally designated 42 and as best seen in FIG. 11, constructed to accommodate the modular increase or decrease of the wattage and/or lumen capacity of the light fixture 32. In this exemplary embodiment, the light board support tower 42 is a four-sided support structure having vertically projecting, spaced apart, support pillars 120*a*-*d* at each corner. The lower end 122*a*-*d* of each support pillar 120*a*-*d* (FIG. 14), respectively, are constructed to slip fit or otherwise secured to the corresponding dual mounting stubs 112*a*-*d* (FIG. 10B) projecting upwardly from the upper surface 108 of the lamp fixture mounting plate 104 thereby preventing lateral movement along the upper surface 108. Spanning between adjacent support pillars are a set of vertically oriented light board stacks, generally designated 124*a*-*d* as best seen in FIGS. 4-8, 10B, and 11. In this exemplary embodiment, there are four such stacks with a single stack spanning between each adjacent support pillar. More specifically, light board stack 124*a* spans between support pillars 120*a* and 120*b*, light board stack 124*b* spans between support pillars 120*b* and 120*c*, light board stack 124*c* spans between support pillars 120*c* and 120*d*, light board stack 124*d* spans between support pillars 120*d* and 120*a*. In this exemplary embodiment, each of the light board stacks 124*a*-*d* are constructed in a similar manner and thus a single light board stack 124*a* will be described as an example.

Figure 12A:
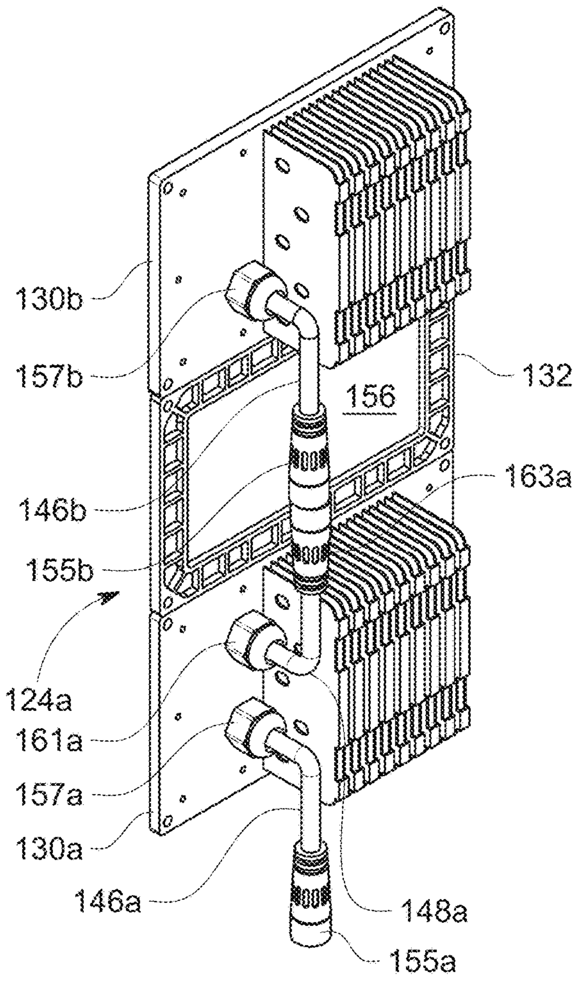
FIG. 12A is a perspective rear view of an exemplary light board stack in an exemplary connected configuration featuring a set of spaced apart light boards that may be incorporated into the light fixture assembly of FIG. 11, in enlarged scale.
Figure 12B:
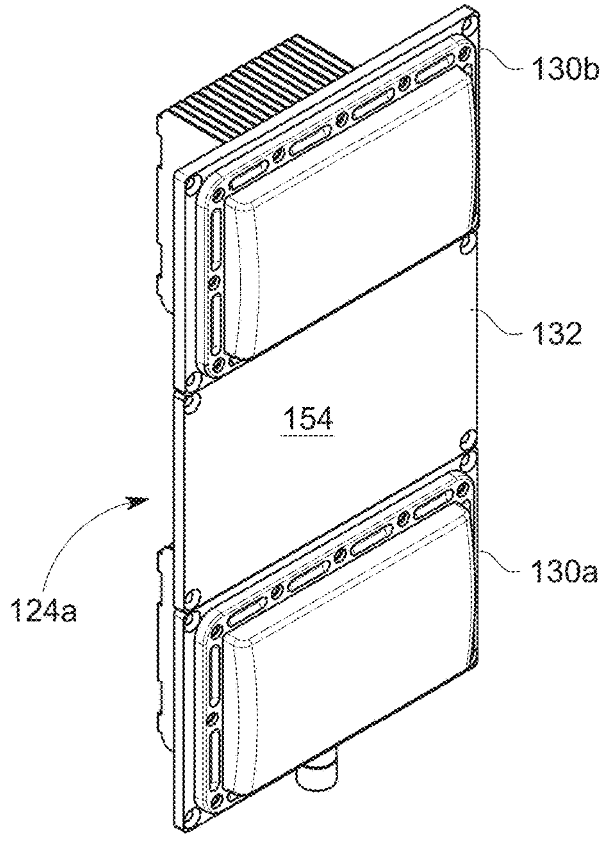
FIG. 12B is the front perspective view of the light board stack of FIG. 12A.

As best shown in FIGS. 12A-12B, the representative light board stack 124*a* includes a lower tier light board 130*a*, an upper tier light board 130*b*, and, in this expandable configuration, a spacer board 132 place therebetween in a vertically aligned orientation between the respective support pillars 120*a*, 120*b* (FIGS. 10B and 11). As the lower and upper tier light boards 130*a*, 130*b* are constructed in a similar manner except for a difference in connectors, a representative light board 130*a* will be described for ease of description.

Figure 10D:
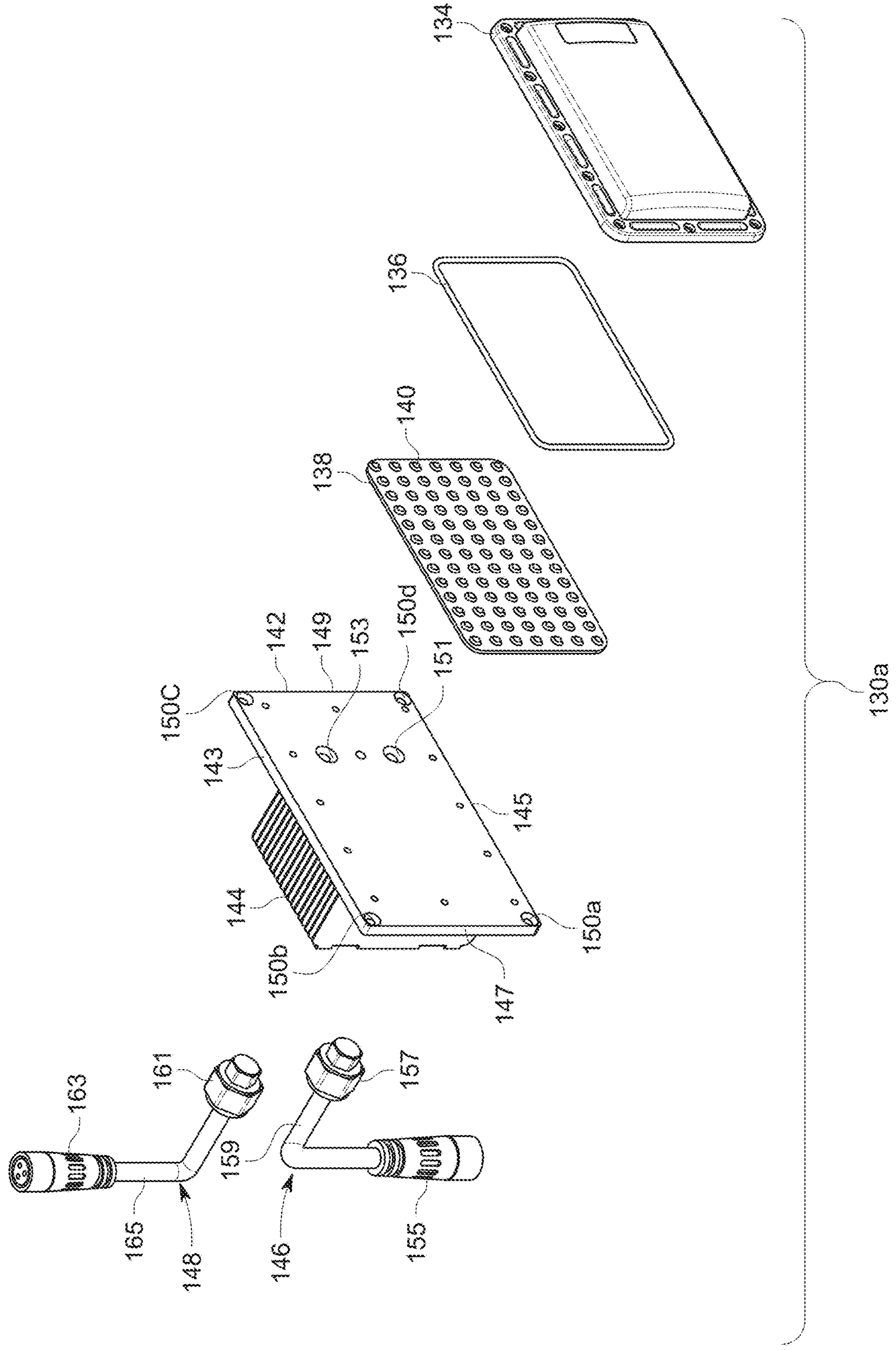
FIG. 10D is an exploded view of an exemplary light board assembly shown in FIG. 10B, in enlarged scale.

Turning now to FIG. 10D, the exemplary light board 130*a* includes an outermost lens polycarbonate cover 134 and, moving from an exterior position to an interior position, a waterproof silicone strip or gasket 136, a lamp board or LED module 138 with an array of light emitting diodes (LEDs) 140, a heat sink plate 142 with a set of inwardly projecting cooling fins 144, and an associate input power cable 146 and an associated output power or passthrough cable 148, also referred to as an expansion cable herein. When assembled, the gasket 136 is sandwiched between the polycarbonate cover 134 and the heat sink plate 142 to protect the LED array 138 once the cover 134 is screwed or otherwise fastened to the heat sink plate 142. The heat sink plate 142 (aluminum mounting plate) generally spans between adjacent support pillars 120*a*-*d* (FIG. 14A for example) and includes a top edge 143, a bottom edge 145 and two opposing side edges 147, 149. In this exemplary embodiment, the cooling fins 144 do not span the entire width of the heat sink plate allowing for pair of input and output terminal receptacles 151, 153 to be located on the heat sink plate. Plugged into the input terminal receptacle 151 is an input power connector 146 with a first end 155, a second end 157 (end that is plugged into the heat sink plate and connected to the LED array), and a length of cable 159 therebetween. Likewise, plugged into the outer terminal receptacle 153 is an output or passthrough cable 148 having a first end 161 (end that is plugged into the output terminal receptacle of the heat skink plate and connected to the LED array), a second end 163, and a length of cable 165 therebetween as best shown in FIG. 10D. Such connection between the end 157 of the power supply cable 146, the end 161 of the passthrough cable 148, and the heat sink board 142 may be constructed in any manner sufficient, including, not limited to a press fit, soldering, plug-in configurations, to place the power in communication with the LED array 140 of the associated light board 130*a* for example.

For a lower tier light board such as 130*a*, the input power cable 146*a* is connected to one of a corresponding output cable 118*a*-*d* of the Y-splitter 114 (FIG. 10B), also referred to the auxiliary connector. In turn, the output or passthrough cable 148*a* of the lower tier light board 130*a* is connected to the input cable 146*b* of the upper tier light board 130*b* behind the spacer board 132 as best shown in FIG. 12A. The passthrough cable 148*a* of the lower light board 130*a* acts as an expansion connector and facilitates adding more light boards such as light board 130*b* in the light board stack. The connector cables 146, 148 on each light board such as light board 130*a* in FIG. 10D allow a plurality of stacked light boards such as light board 130*a* connected to light board 130*b* to be connected in series thereby increased the wattage or lumen capacity corresponding with the number of stacked light boards. It will be appreciated that the connectors between the lower light board and the upper light board pass behind the spacer board when assembled. The connectors are preferably of sufficient length to the span one or more spacer boards.

Alternatively, the wattage or lumen capacity may be reduced by removing one or more light boards in a light board stack. It will be noted that, in this exemplary embodiment, the upper tier light board 130*b* does not include an expansion connector, unlike the lower tier light board 130*a*. In general, the uppermost light board in a light board stack 124*a* does not need an expansion connector since no other light board is positioned above the uppermost light board in the light board stack. This saves the cost of adding a cable that is not being used. However, this is not meant to be limiting and any light board may incorporate both a power in connector 146 and an expansion connector 148 for simplicity in manufacturing allowing for every light board to be inserted anywhere along the light board stack 124*a*.

With the polycarbonate cover 134 secured to aluminum heat sink plate 142 sandwiching the gasket 136 and disposing the LED array 140 against the heat sink plate, the assembled light boards 130*a*, 130*b* in the light board stack 124*a* may be secured to the adjacent support pillars 120*a*, 120*d*, for example, by inserting a set of screws 152*a-d* (as for example, shown in FIG. 4) through a set of four aligned apertures 150*a-d* (FIG. 10D) at each corner of the heat sink plate to fasten the corresponding light board to the spaced apart support pillars, which have complementary threaded recesses (not shown) for receiving the ends of the screws. However, the screws are easily unscrewed to remove the light boards from the support tower 42. Each light board may be removed independently of any other light board. Alternatively, the heat sink plate 142 may be secured to the support pillars and the cover 134 secured to the heat sink plate independently.

Figure 13A:
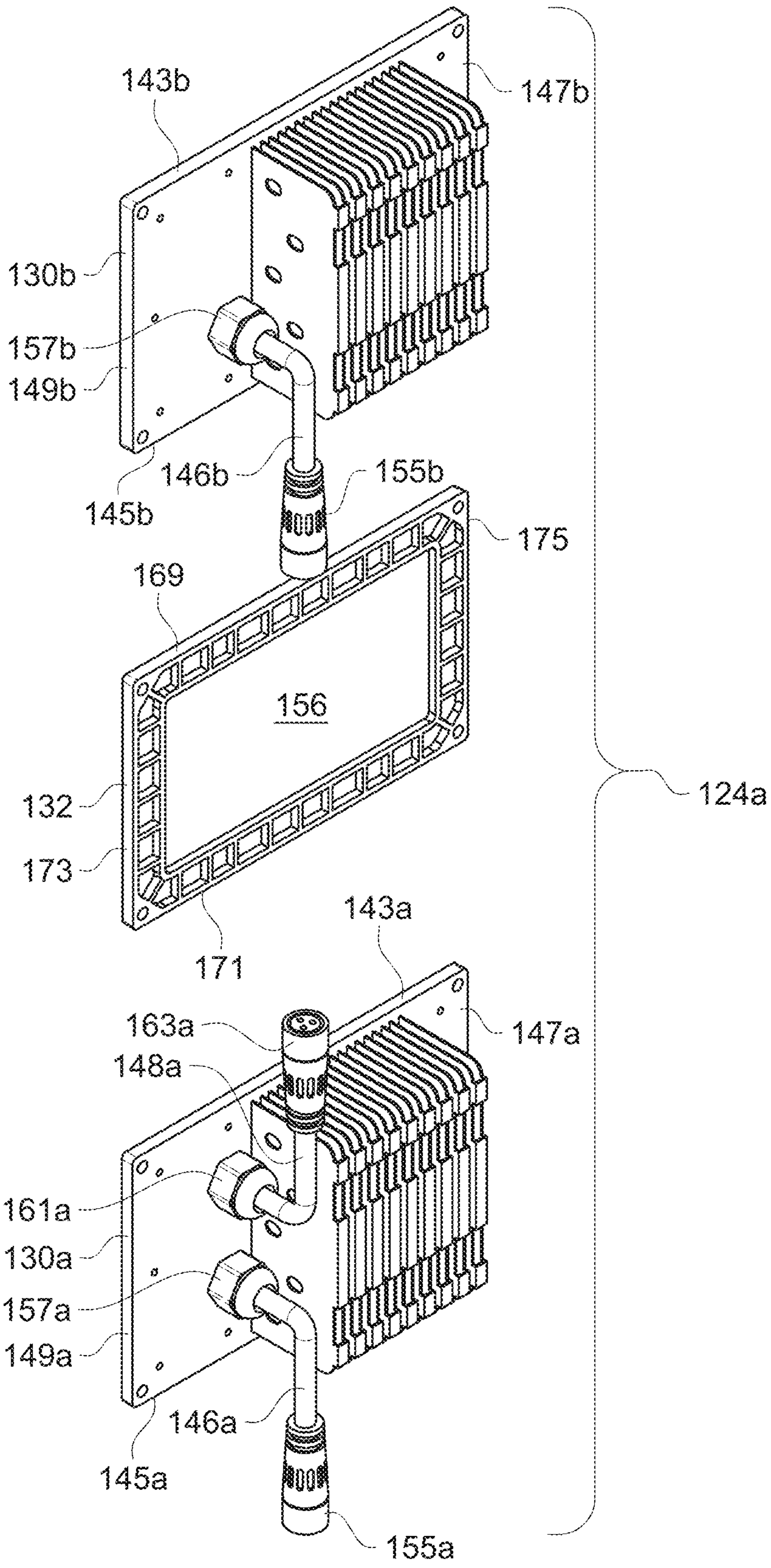
FIG. 13A is a similar view to FIG. 12A with the light boards in the light board stack disconnected.
Figure 13B:
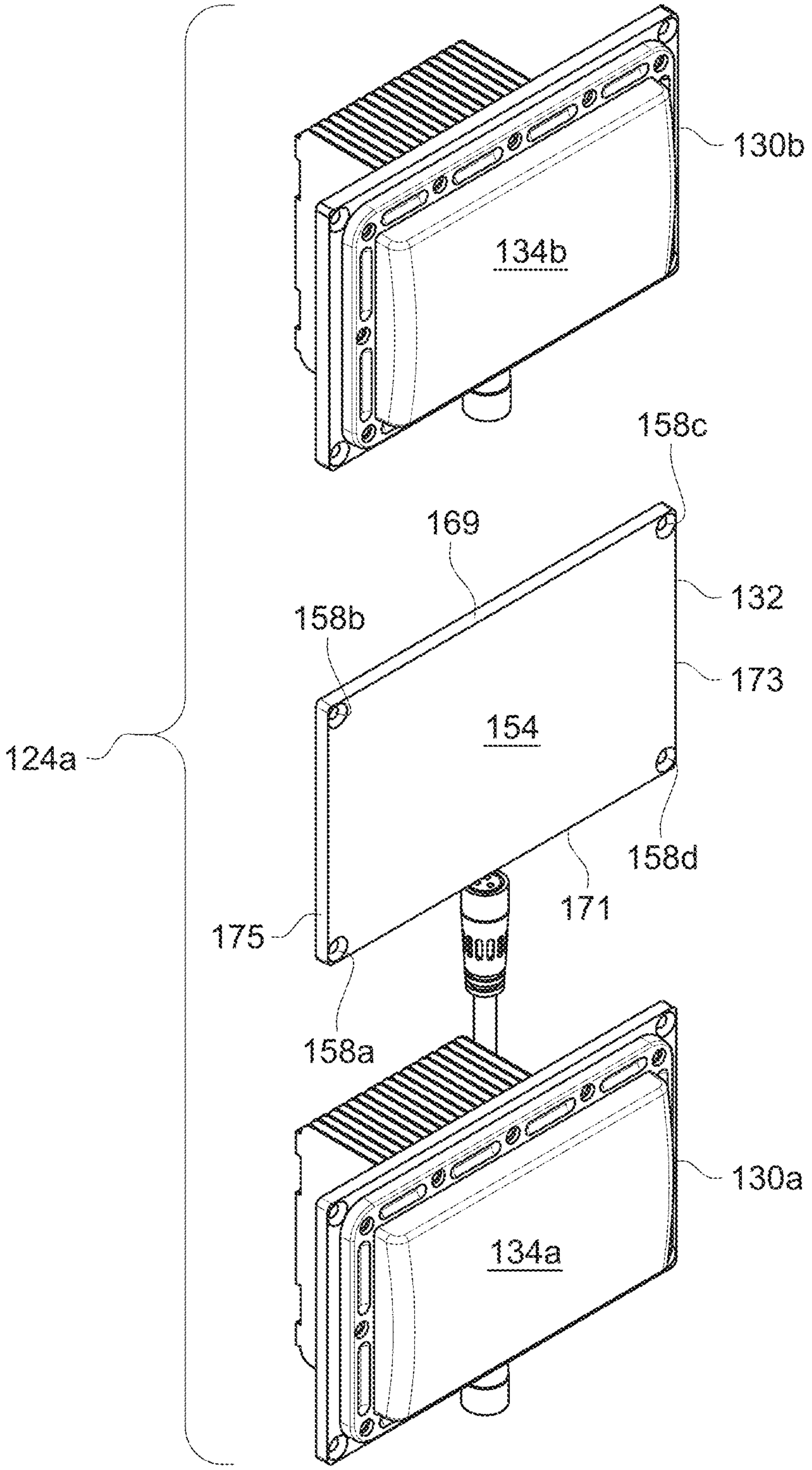
FIG. 13B is a similar view to FIG. 12B with the light boards in the light board stack disconnected.

Turning back to FIGS. 12A-12B, the spacer element 132 includes a front surface 154 and a rear surface 156 and spans the gap between adjacent support pillars or posts preventing debris from entering the interior region of the support tower 42. The spacer element has the same height and width dimensions as the portion of the light boards that fits between adjacent posts and includes a top edge 169, bottom edge 171 and two opposing side edges 173, 175, respectively as shown in FIGS. 13A-B. As with the light boards, each spacer element 132 includes a set of four corner disposed screw holes 158*a-d* (FIG. 13B) for securing the individual spacer element to adjacent support pillars 120*a*, 120*b*, for example, using a set of complementary screws fastening the spacer board into corresponding complementary threaded recesses (not shown) in the support pillars. In other words, the spacer element 132 may be secured to adjacent pillars in a similar manner to the light boards 130*a*, 130*b* and fill the same height and width spans as the light boards as well.

It will be appreciated that the spacer or spacer board 132 serves a dual purpose of maintaining a gap between adjacent lights boards 130*a*, 130*b* in the light board stack 124*a* facilitating additional heat control throughout the modular light fixture system 30. In addition, as will be explained below with reference to FIGS. 15A-D, the spacer element 132 may be swapped out for an additional light board in a light board stack to increase the wattage or lumen capacity of a light board stack 124*a*.

Turning now to FIGS. 10B-10C, to complete the support tower 42, a square fan mounting plate 160 with a central aperture 162 and four corner slots 164*a-d* for receiving the top ends 166*a-d* of the respective support pillars 120*a-d* to restrain them in place. A lower surface 167 (FIGS. 14A-B) of the fan mounting plate rests atop the upper edges 143*b* (FIG. 14B) of the uppermost light boards 130*b* with a portion of the upper section of the support pillars extending therethrough as best shown in FIGS. 11 and 14A-C. The upper surface 168 (FIGS. 14A-B) of the fan mounting plate 160 provides a mounting surface for a fan 170 that is secured to the fan mounting plate 160 using a set of screws. The fan and exposed upper sections of the support pillars are in turn covered by a protective shell 172 also secured to the fan mounting plate as shown in FIGS. 10C, 11, 14D and 15A-C, for example. The protective shell includes a number of laterally disposed passthrough slots 178 in each of the four sidewalls 180*a-d* (FIGS. 4-7) of the protective shell for allowing air to passthrough and blow out toward the interior sidewalls of the diffuser 34 to inflate and maintain the inflation of the diffuser while the fan is operating. It will be appreciated that the central aperture 162 (FIG. 10C) in the fan mounting plate 160 allows air to be drawn out of the interior of the support tower 42 to provide a cooling effect on the light board stacks 124*a*.

Figure 8:
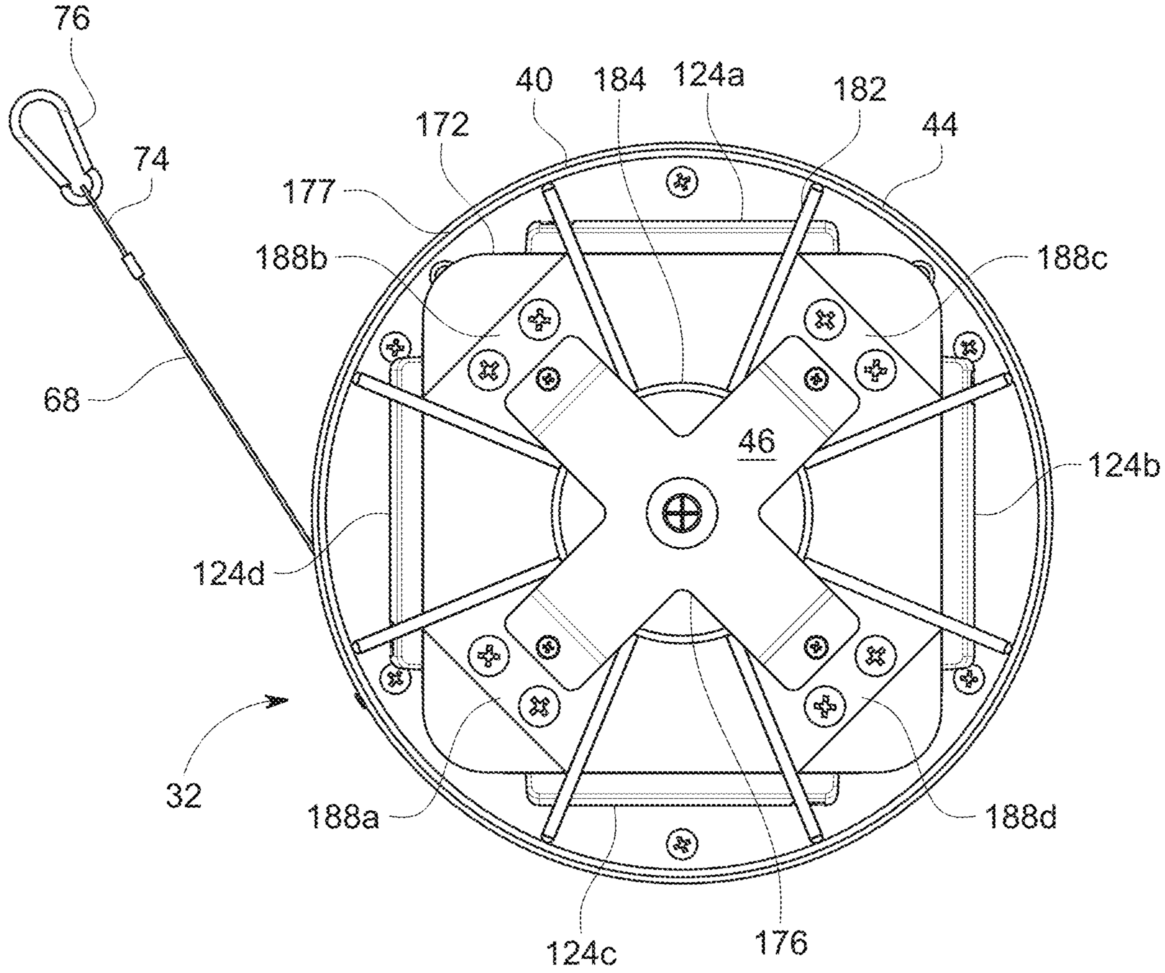
FIG. 8 is a top view of the light fixture assembly of FIG. 3.

To further protect the support tower 42 and electronic components secured thereto, a rigid protective wire cage 44 is employed. The cylindrical cage is constructed to slip over the assembled light board support tower 42 with the lower end resting on the lamp fixture mounting plate 104. As best shown in FIGS. 8, 10C and 11, the protective cage is open at the bottom end 174 and partially covered at the top end 177 with a series of support ribs 182 projecting from the outer circumference of the cage 44 to a central circular wire 184 defining a central opening 186. In this exemplary embodiment, there are four sets of support ribs 182 with each set converging from the outer periphery of the cage toward the central circular wire 184. Between each converging set is a wedge-shaped fastening plate 188*a-d*. The fastening plates 188*a-d* include openings for receipt of a complementary set of threaded fasteners passing through the openings in the fastening plates and through aligned openings in the protective fan shell 172 to terminate in complementary threaded openings (not shown) in the top ends of the four support pillars 120*a-d* thereby releasably securing the protective cage 44 and protective fan shell 172 to the top of the support pillars 120*a-d*.

In addition to the primary fastening holes for the protective cage 44, a secondary set of fastening holes is provided in each of the fastening plates 188*a-d* to receive and fasten a cross-shaped diffuser fixing bracket 176 placed atop the protective cage 44. The cross-shaped diffuser bracket 176 includes a central hole 190 (FIG. 11) coaxially aligned with the central opening 186 of the protective cage 44. With protective shell 172, protective cage 44, and diffuser bracket 176 releasably secured using threaded fasteners or other suitable fasteners, the inflatable diffuser 34 may be slipped over the assembled support tower 42 and secured in place around the circumference of the lower housing 40 as shown in FIGS. 1-2.

In general, the inflatable diffuser 34 includes a collar 192 (FIG. 2) at the lowermost end that may be slip fit over the entire assembled internal light fixture assembly 32 and pulled down to align the collar around the sidewalls of the lower housing 40. The lower end of the inflatable diffuser may then be zipped close and secured to the lower housing 40 using a suitable fastener. In this configuration, the upper end 194 of the diffuser 34 rests stop the diffuser fixing bracket 176 with a central aperture (not shown) aligned with the central hole 190 of the diffuser fixing bracket allowing a threaded fastener 196 to pass through and releasably secure the upper end of the inflatable diffuser to the diffuser fixing bracket. With the top and bottom ends of the inflatable diffuser releasably locked in place, this configuration maintain a fixed longitudinal distance between the top of the diffuser and the bottom of the diffuser. In use, as described below, the fan unit 170 may be powered on to draw in air through the openings 51 in the sponge pressing plate 48, through the filtering sponge 50, through the openings in the bottom surface 47 of the lower housing, through the opening 106 in the tower support plate 104 to the interior space defined by the light board stacks 124*a* assembled onto the support tower 42. This assists in cooling the light board stacks. The interior air is then further drawn into the fan unit 170, which directs air laterally out through the passthrough slots 180*a-d* in the fan protective shell 172 toward the interior sidewalls of the diffuser 34 to inflate and maintain the inflation of the diffuser while the fan is on. It will be appreciated that the diffuser 34 may include a zipper 35 (FIG. 2) or other similar closure device to allow for additional expansion and ease of slipping the diffuser over the light fixture 32.

Methods of Assembling the Modular Light Fixture: Turning now to FIGS. 10A-15D, the assembly of a first embodiment of the modular light fixture assembly 32 will be discussed followed by the swapping out of one or more light boards to alter that wattage capacity of the light fixture with the understanding that the modular light fixture will be used with an inflatable diffuser 34 and some sort of mounting structure, such as the exemplary tripod 36 in FIG. 1. In this first exemplary embodiment, the modular light fixture assembly 32 is expandable from 400 W to 600 W, with each light board 130*a*, 130*b* having a 50 W capacity. In this exemplary embodiment, the corresponding lumen rating for each 50 W light board is 7,250 lumens.

Figure 14A:
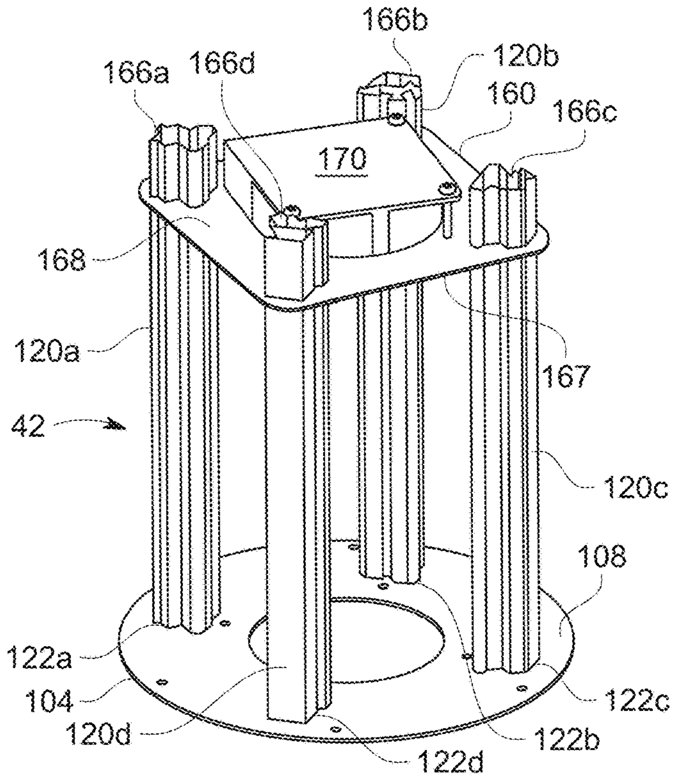
FIG. 14A depicts an assembled light board support tower of the light fixture assembly of FIG. 3, in reduced scale, prior to installation of the light boards.

Turning now to FIG. 14A, the light board support tower 42 is assembled. More specifically, the lower ends 122-*d* of the support pillars 120*a-d* have been anchored to the corresponding set of dual support stubs 112*a-d* (FIG. 10B) projecting from the upper surface 108 of the lamp fixture mounting plate 104. At the opposing ends of the support pillars, the pillar receiving slots 164*a-d* (FIG. 10C) of the fan mounting plate 160 are slipped over the upper ends 166*a-d* of the support pillars and locked in place. The fan 170 is then secured to the upper surface 168 of the fan mounting plate 160. At this point, the assembly generally resembles the depiction in FIG. 14A.

Figure 14B:
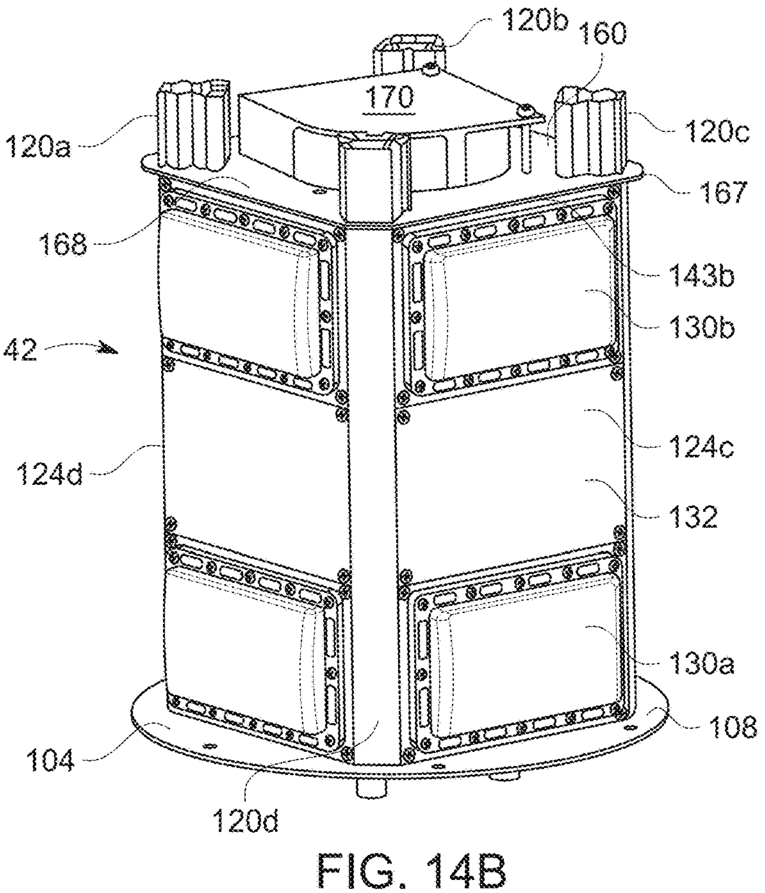
FIG. 14B depicts an assembled light board support tower with the light boards installed as may be incorporated into the light fixture assembly of FIG. 3, in reduced scale.

Turning now to FIG. 14B, the light boards 130*a*, 130*b* and associated spacer element 132 are fastened to the corresponding pillars 120*a-d* of the support tower 42 to build a light board stack 124*a-d* for each side of the support tower 42. More specifically, in this exemplary embodiment, each side of the four-sided support tower 42 includes a lower light board 130*a*, a middle spacer board 132, and an uppermost light board 130*b* fastened to adjacent pillars 120*a-d* in the support tower in a vertical stack orientation. The power input cables 146*a* of the lowermost light boards 130*a* are passed through the central opening 106 in the lamp fixture mounting plate 104 for subsequent connection to the corresponding connector end 118*a-d* in the auxiliary connector 114. In addition, the expansion connectors 148*a* of the lower light boards 130*a* are connected to the corresponding input cable 146*b* in the next light board 130*b* in line in the light board stack 124*a*. Such completed connections are shown in FIG. 12A while the front and back sides of an exemplary light board stack 124*a* are shown in FIGS. 12A-12B (connected in series) and FIGS. 13A-13B (disconnected with cables separated). Then, once power is supplied to the lowermost light board 130*a* in the light board stack 124*a*, all of the other light boards 130*b* in the entire light board stack receive power to energize their respective LED arrays 138.

Figure 14C:
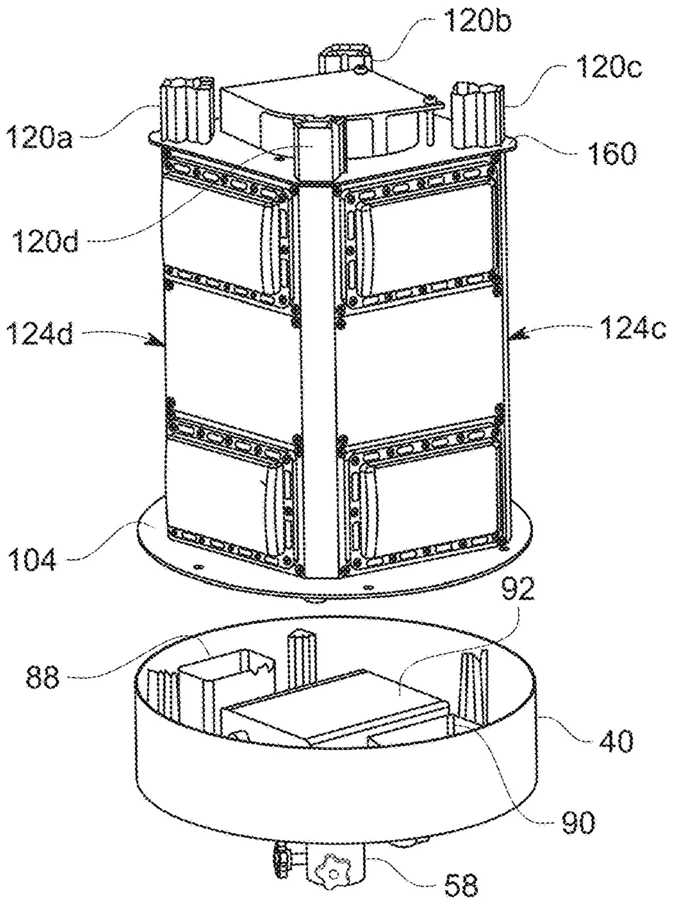
FIG. 14C depicts an assembled light board support tower with the light boards installed positioned atop the lower housing of the light fixture assembly of FIG. 3, in reduced scale.

As shown in FIG. 14C, the support tower 42 with light board stacks 124*a-d* (FIGS. 10B, 11, and 14C) fastened on each side is secured to a pre-assembled lower housing 40 (as shown in FIGS. 3-7 and 9) with a set of threaded fasteners anchoring the support tower and light board stacks to the top of anchor posts within the periphery of the interior recess 86 of the lower housing. It will be appreciated that the lamp fixture mounting plate 104 may be secured to the lower housing 40 first and then the remainder of the support tower 42 assembled onto the lamp fixture mounting plate. The splitter 114 is also coupled to the driver unit 92 and the terminal connectors 118*a-d* are passed through the opening 106 in the mounting plate 104 for access by the lower light board cables 146*a*. In addition, a cable for connecting the fan unit 170 to corresponding port 100 on the driver unit and a cable for connecting the dimmer controller 84 to the corresponding port 96 on the driver unit are threaded through the unit to connect to their corresponding devices (fan 170 and dimmer knob 84).

Figure 14D:
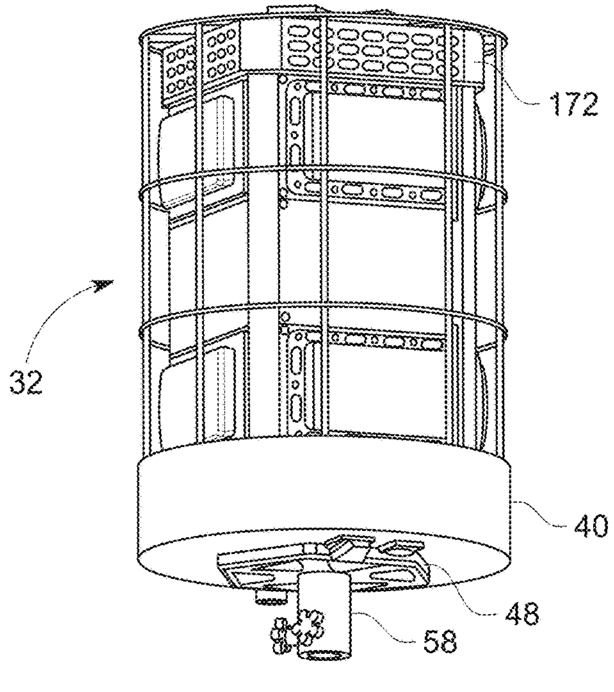
FIG. 14D depicts the assembled light board support tower with the light boards, bottom housing, and protective cage installed as may be incorporated into the light fixture assembly of FIG. 3, in reduced scale.

Then, as best shown in FIGS. 10C, 11, and 14D, the fan protective shell 172 is placed over the fan 170 followed by the protective cage 44 slipped over the support tower 42 and light board stacks 124*a-d* with the top end 177 of the cage 44 resting atop of the fan protective shell and the bottom end 174 resting on the mounting plate 104. Fasteners are used to secure the protective cage 174 and fan protective shell 172 to the top ends 166*a-d* (FIG. 14A) of the support pillars 120*a-d*. The cross-shaped diffuser fixing bracket 176 is then fastened to the top of the protective cage 44 as best shown in FIG. 8. At this point as shown in FIG. 14D, the modular light fixture assembly 32 is ready for placement on a mounting structure such as the tripod 36 followed by placement of the inflatable diffuser 34 over the modular light fixture assembly 32. Once external power is supplied to the cable input port 80 through a power supply cable 82 with the splitter 114 and light boards 130*a*, 130*b* in each light board stack 124*a-d* connected, all associated lamp boards 138 (FIG. 10D) will be energized and emit light. Alternatively, an onboard battery source may be used instead of an external power source.

Given the foregoing, the electrical power path generally flows from the external power supply (not shown) through the power supply cable 82 through the lower housing input port 82 to the input end 116 of the Y-splitter 114. The power path continues on through one of the output ends 118*a-d* of the Y-splitter to the connected to the input connector of the input power cable 155*a* (FIGS. 12A and 13A) of the lowermost light board 130*a* in the light board stack 124*a* (or 124*b-d*). Power is then supplied to the LED array 138 (FIG. 10D) of the lowermost light board 130*a* causing the lowermost LED array to emit light, which eventually passes through the inflatable diffuser 34 when assembled. The power continues through the lower light board to the next light board 130*b* in line via a connection between the end 163*a* of the lower light board expansion connector 148*a* and the end 155*b* of the input connector 146*b* of the upper light board 130*b* to supply power to the uppermost LED array (for example 138 in FIG. 10D), which also emits light adding to the overall illumination of the modular light fixture assembly 32. Such illumination of the lower and upper light boards 130*a*, 130*b*, respectively, takes place simultaneously or near simultaneously given any negligible lag effects in the cabling and related connectors.

Figure 15A:
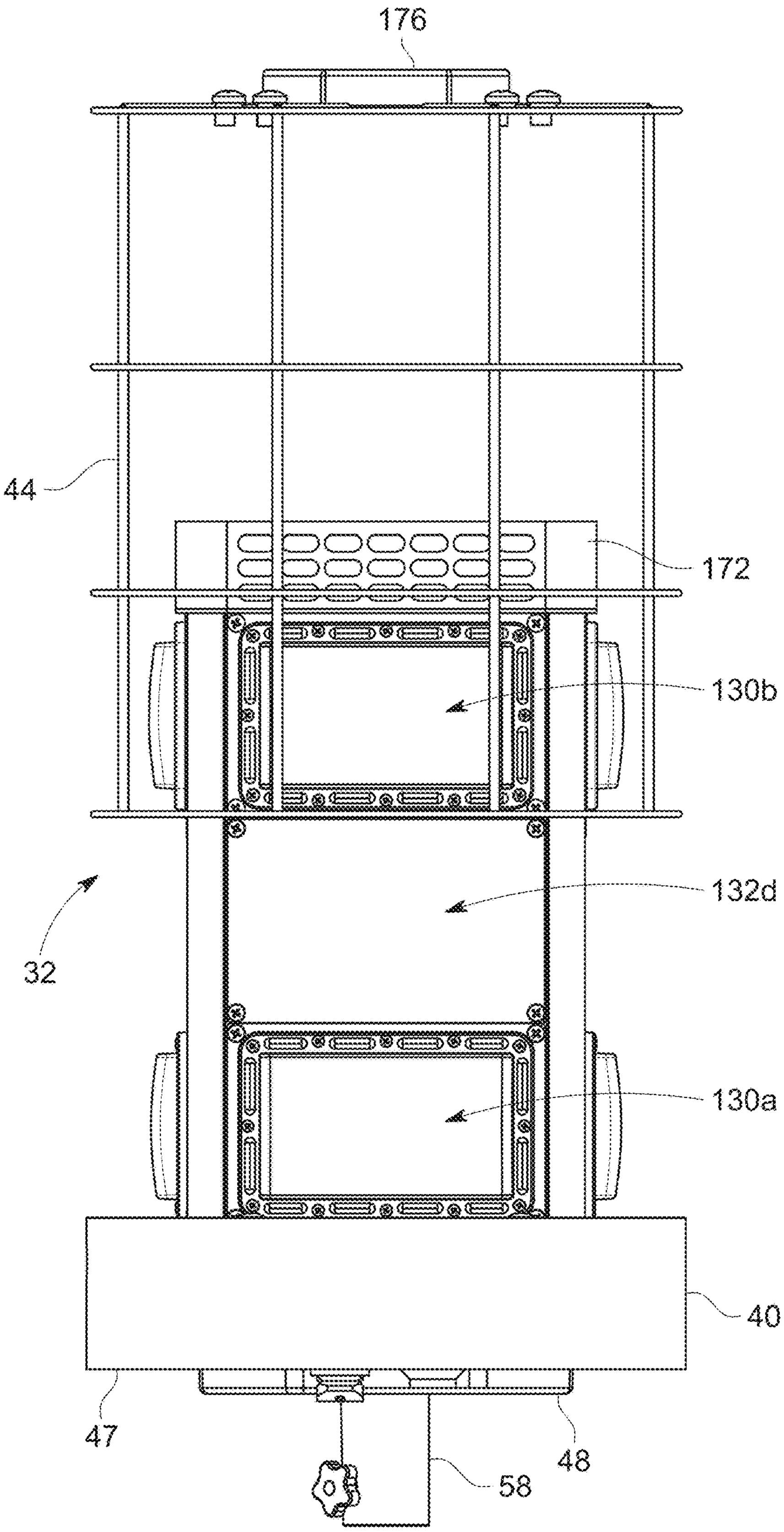
FIG. 15A depicts a front view, in reduced scale, of the light fixture assembly of FIG. 3 entering into an exemplary progression for swapping out placeholder boards for light boards within the light board support tower.
Figure 15B:
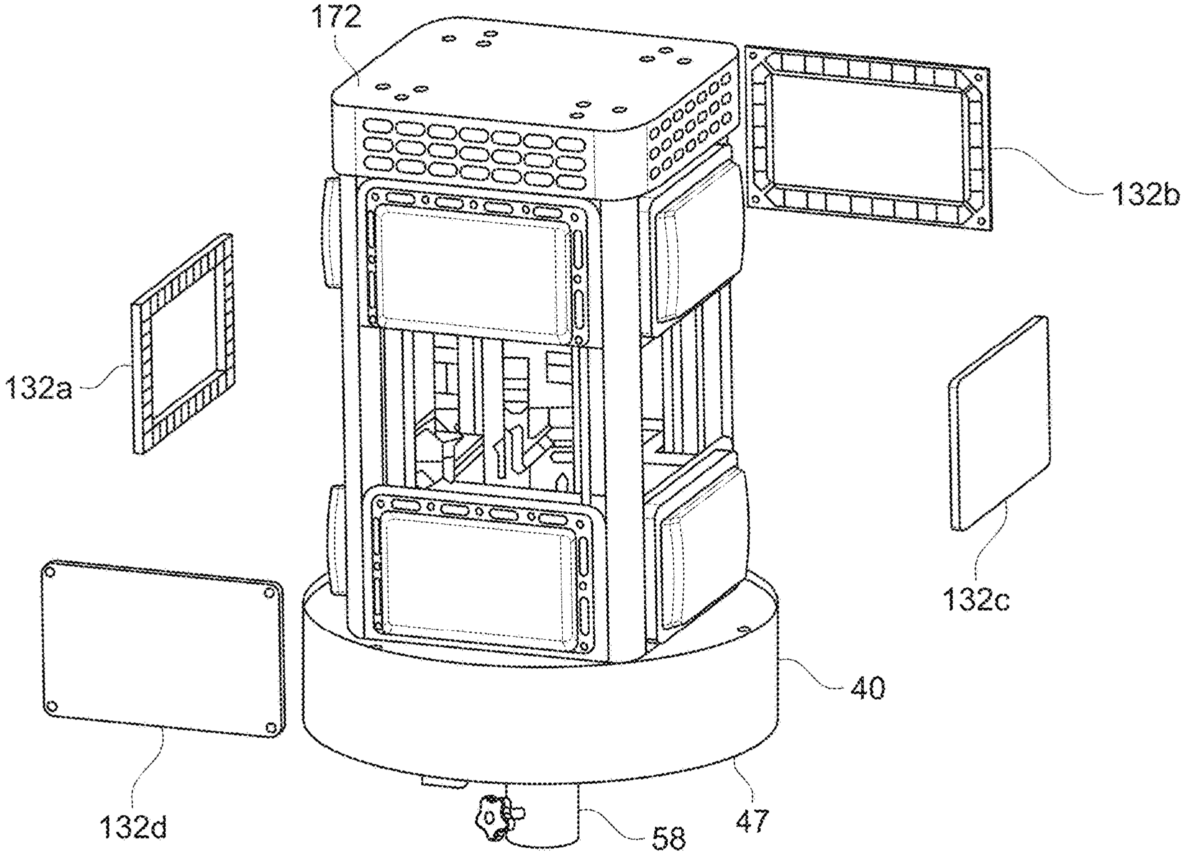
FIG. 15B depicts a front perspective exploded view, in reduced scale, depicting a subsequent step to FIG. 15A wherein the placeholder boards have been removed.
Figure 15C:
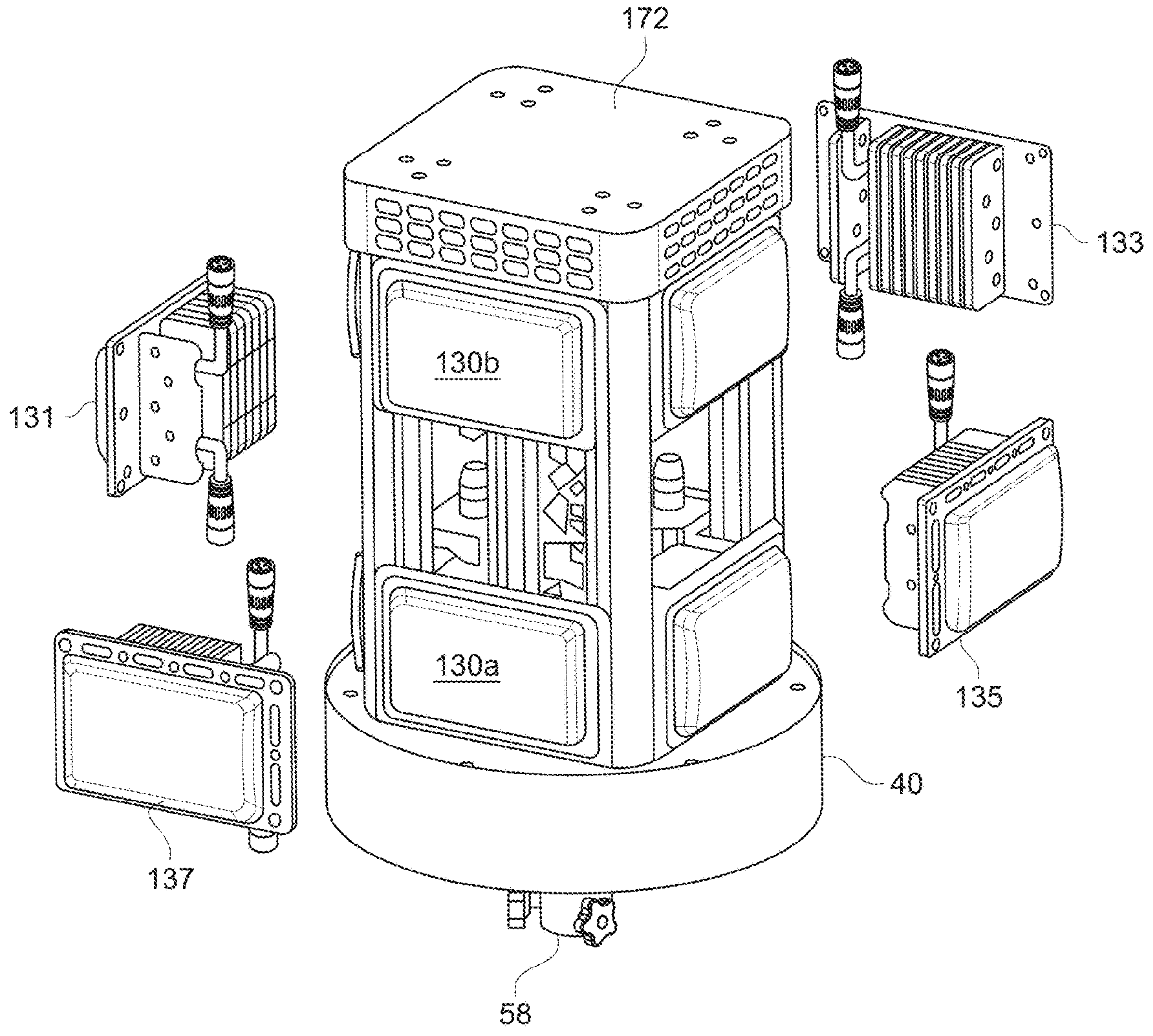
FIG. 15C depicts a similar view to FIG. 15B depicting a subsequent installation step to FIG. 15B wherein the light boards are exchanged for the placeholder boards.
Figure 15D:
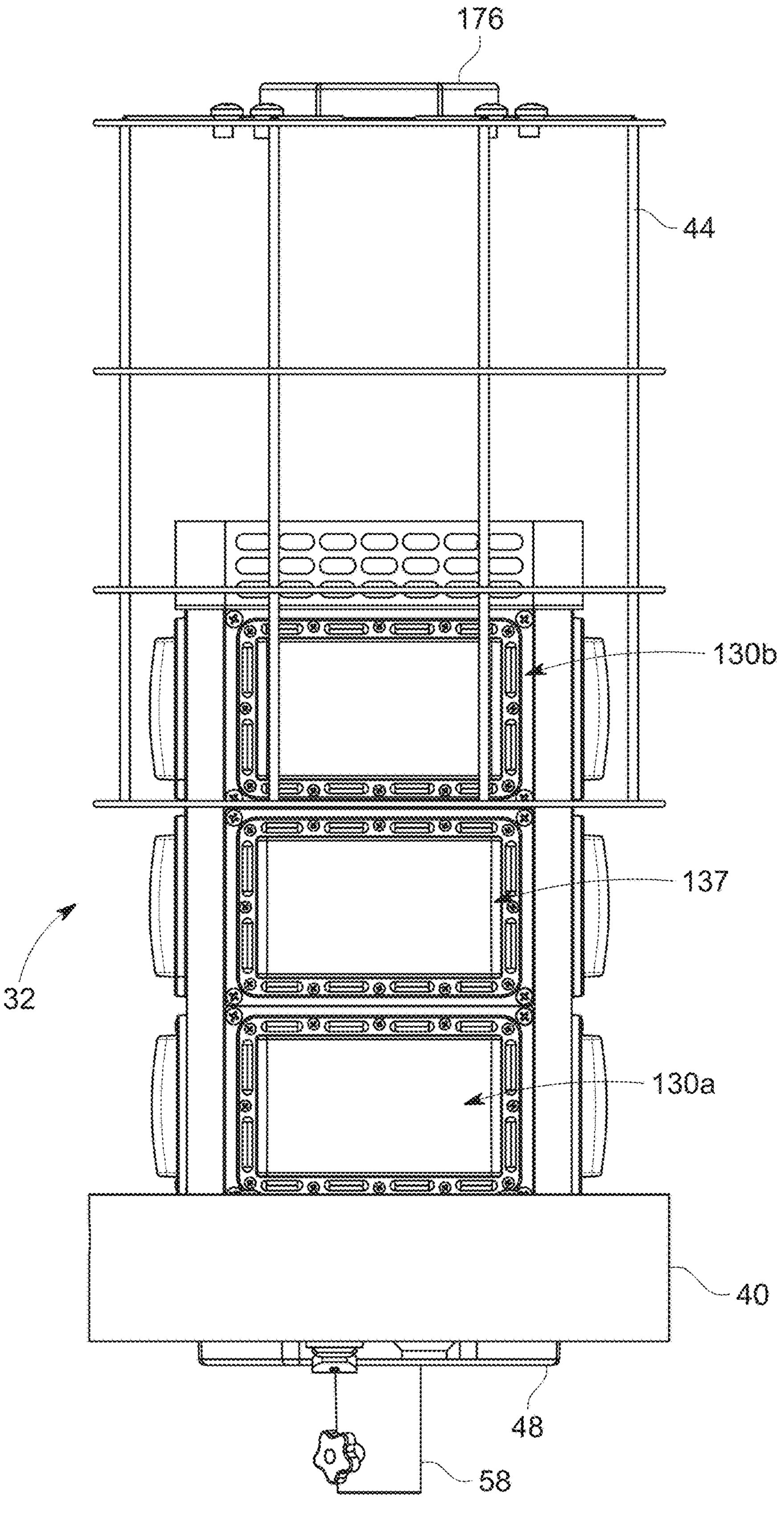
FIG. 15D is a front view similar to FIG. 15A depicting a subsequent step to FIG. 15C wherein the light boards have been connected within the light board support tower and the cage is partially placed thereon.

To alter the wattage capacity of a modular light fixture assembly 32 and referring to FIGS. 15A-D, one or more spacer boards 132 may be removed and replaced with a corresponding light board 130*c* (FIGS. 15C-15D). More specifically, as shown initially in FIG. 15A, assuming the diffuser 34 has been removed, the fasteners holding the diffuser fixing bracket 176 and protective cage 44 to the top of the support pillars 120*a-d* are removed and the protective cage with diffuser fixing bracket withdrawn upwardly from the support tower 42 as shown in progress in FIG. 15A. It will be appreciated that the diffuser fixing bracket does not need to be removed prior to the protective cage as the fixing bracket does not interfere with removal of the fasteners releasably securing the protective cage to the support pillars 120*a-d*. With the support tower 42 exposed, the user may remove select one or more spacer boards 132*a-d* for removal and remove the fasteners freeing the spacer board from the support tower 42 as shown in FIG. 15B.

Turning now to FIG. 15C, for each spacer board 132*a-d* removed, a light board 131, 133, 135, 137 may be substituted in to alter the wattage capacity of the modular light fixture assembly 32. In this exemplary embodiment, the spacer boards 132*a-d* disposed between upper and lower light boards 130*a*, 130*b* in each light board stack 124*a-d* have been removed from each of the four sides of the support tower 42. The previous cable connections between the upper and lower light boards 130*a*, 130*b* in each light board stack 124*a-d* are disconnected such as shown in FIG. 13A. The additional intermediate light boards 131, 133, 135, and 137 are positioned in between the upper and lower light boards. Then, then adjacent input and expansion connectors are coupled together and the intermediate light boards fastened in place in the position the spacer board 132*a-d* previously occupied. In this exemplary embodiment, the tri-level light board configuration has increased from a 400 W capacity to a 600 W capacity with each light board representing a 50 W capacity. More specifically, the lower light boards, such as those designated 130*a* present a lower lighting tier with each board having a 50 W capacity. Likewise, the upper light boards, such as those designated 130*b*, present an upper lighting tier with each board also having a 50 W capacity in this example. With the spacers in place, the capacity with the lower and upper tiers is 400 W (4×50 W×2 tiers). With the intermediate row of light boards 131, 133, 135, and 137 added to each light board stack 124*a-d*, an intermediate lighting tier is defined and adds another 200 W (4 more boards at 50 W each) to the overall capacity of the light fixture assembly 32. Once the light boards are secured to the support tower 42, the open end of the protective cage 174 with the attached fixing bracket 176 on the opposing top end is then slipped over the support tower 42 and re-secured to the top of the support pillars 120*a-d* as shown in progress in FIG. 15D.

Notably, the lower housing 40, the fan 170, and the fan protective shell 172 do not need to be removed to swap out light boards and spacer boards. In addition, it will be appreciated that one or more light boards 130*a*, 130*b* may be removed and swapped with a spacer board to reduce the wattage capacity of the modular light fixture assembly 32 if desired.

Figure 16:
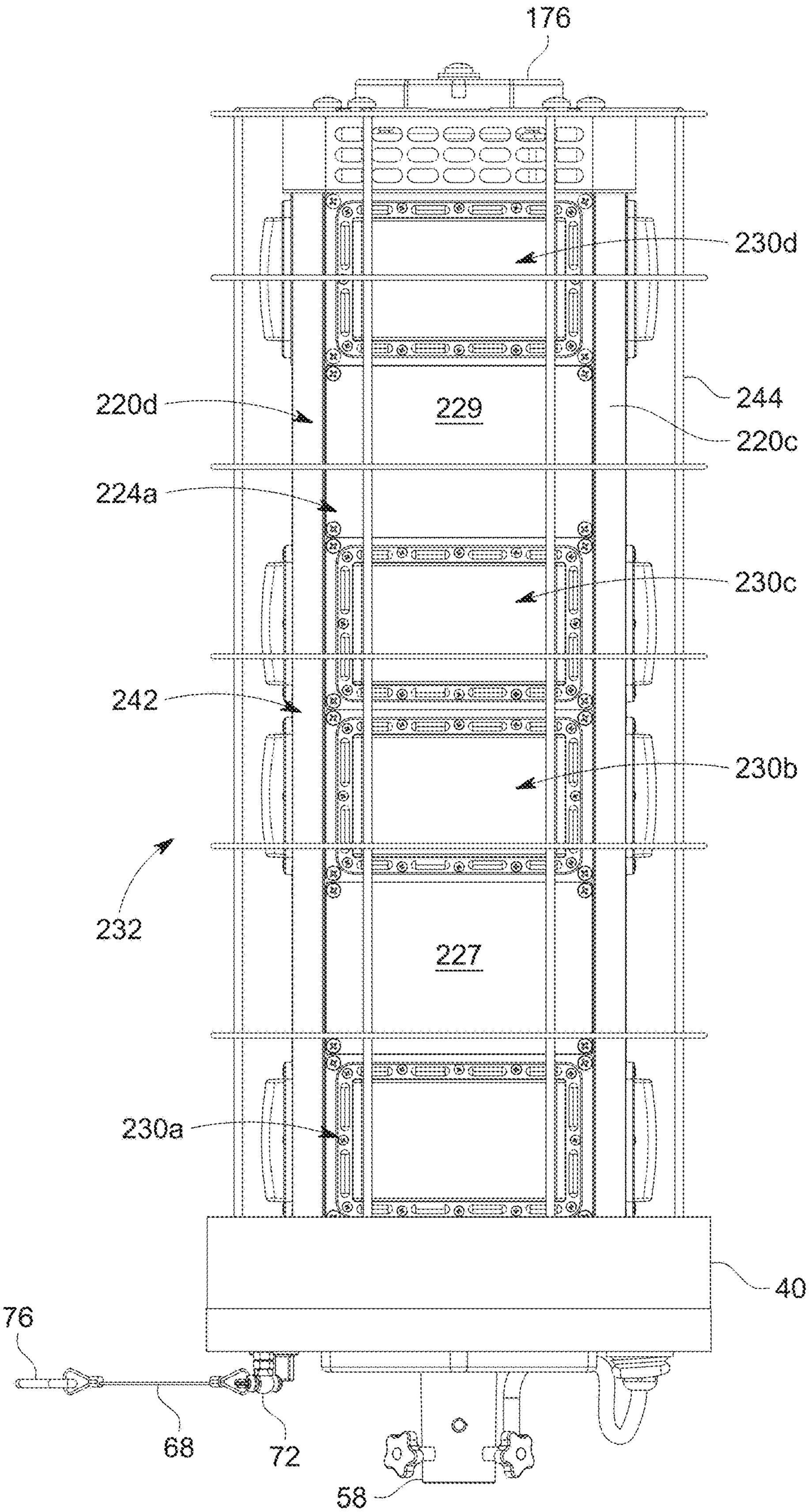
FIG. 16 is a front view of an alternative embodiment of a light fixture constructed in accordance with the disclosure with the top and bottom views being the same as in FIGS. 8 and 9, respectively.
Figure 17:
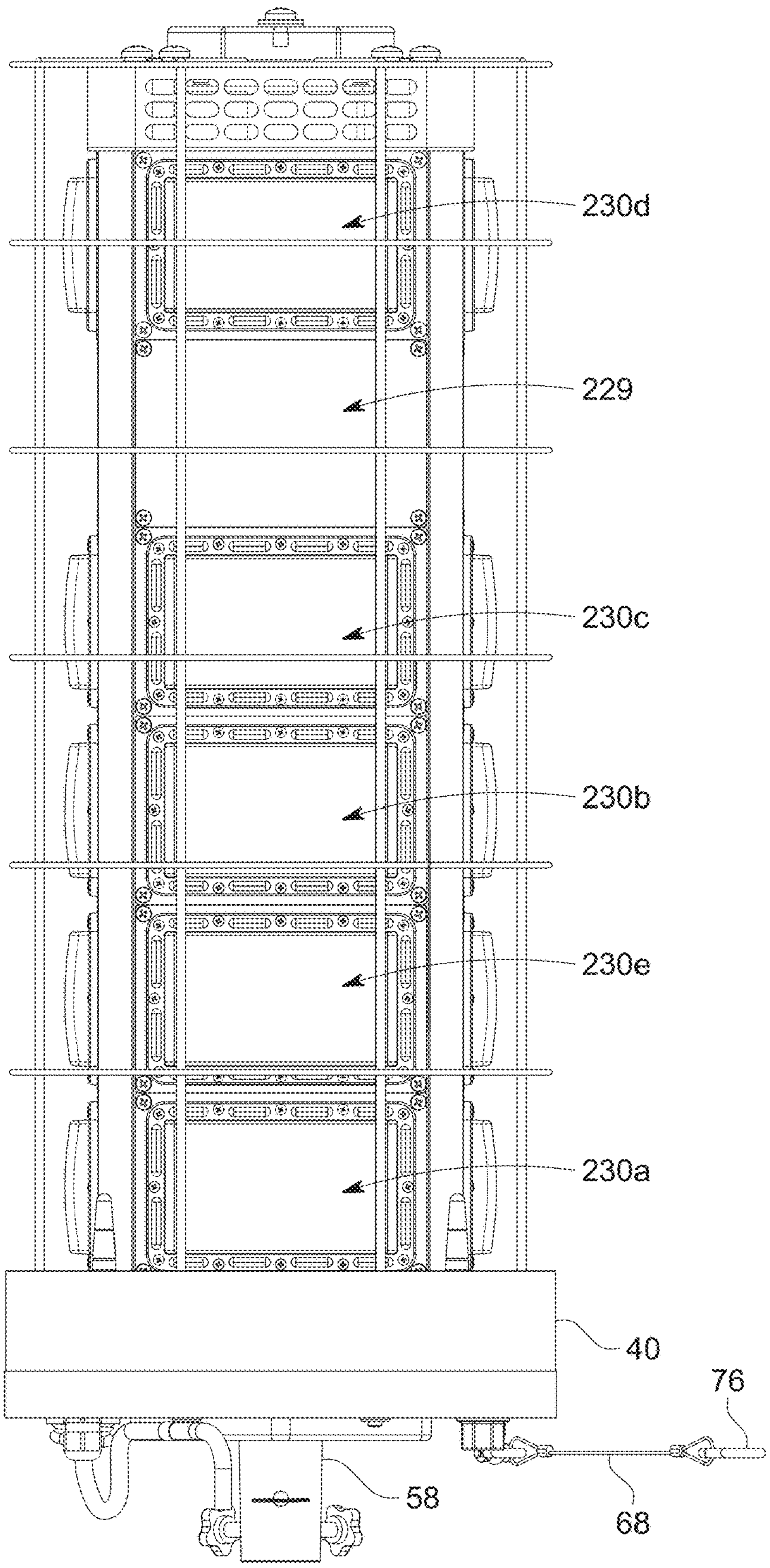
FIG. 17 is the same view as FIG. 16 with one additional light board installed.
Figure 18:
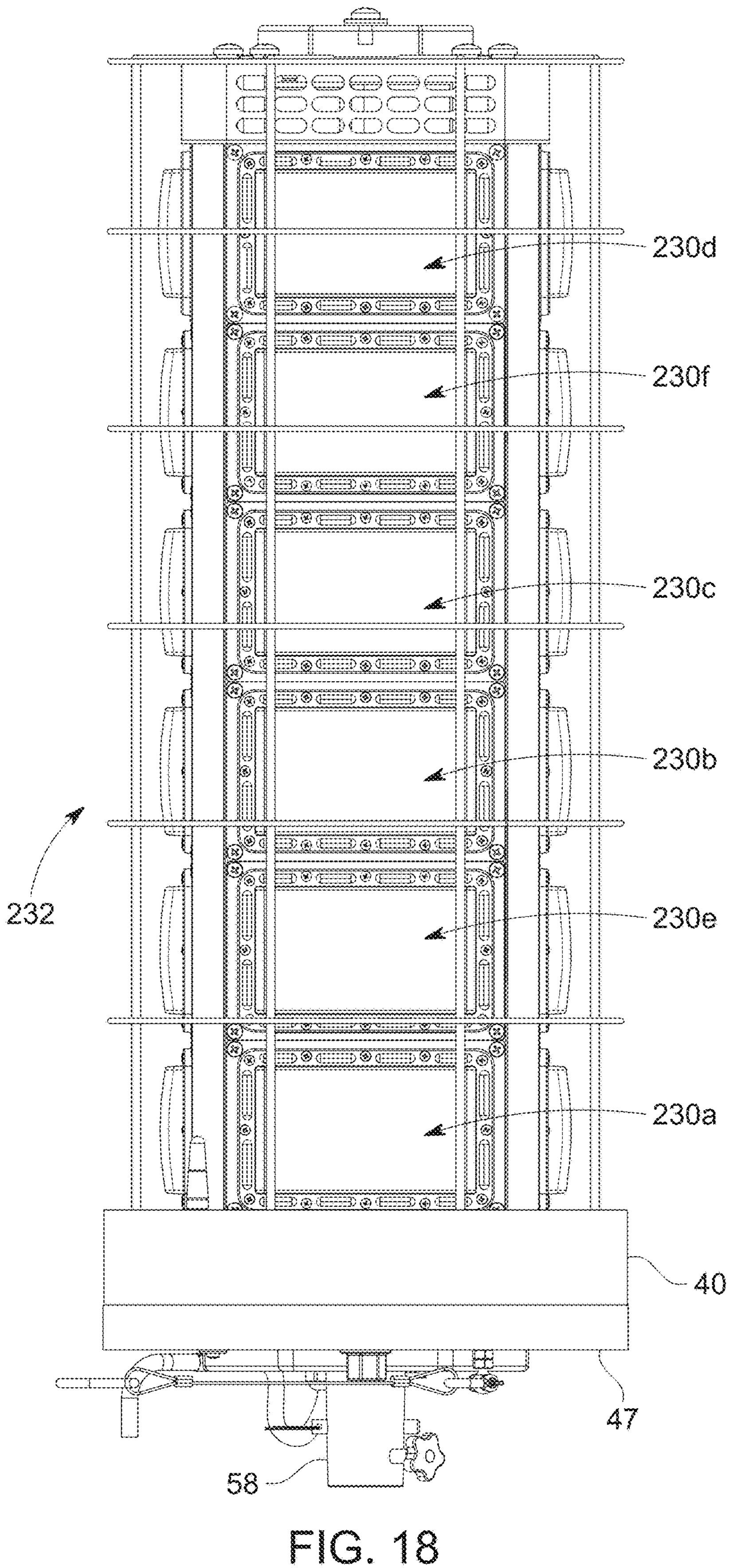
FIG. 18 is the same view as FIG. 16 with two additional light boards installed.

Alternative Embodiments: With reference to FIGS. 16-18, an alternative modular light fixture 232 is shown that may be used with the same (or expanded) diffuser 34 and mounting structure 36 as in the prior embodiment. As the construction of the modular light fixture 232 is similar to the construction of the modular light fixture 32 discussed above except where noted, like components will be like numbered. For example, the width of this alternative modular light fixture 232 is the same as the previous light fixture 32 and thus the lower housing 40 (and associated components secured thereto), lamp fixture mounting plate 104, fan mounting plate 160, fan 170, fan protective shell 172, and diffuser fixing bracket 176 may all be used in either embodiment. The main difference is the height of the support tower 242 to accommodate a larger number of light boards 230*a*, 230*b*, 230*c*, and 230*d* and the height of the protective cage 274 to accommodate the larger support tower 242.

As with the prior embodiment, the support tower 242 includes a set of four elongated support pillars (only 220*c* and 220*d* shown) with a greater length than the prior embodiment. However, the lateral spacing between the support pillars is the same as the prior embodiment. In the prior embodiment, the four-sided support tower 42 was constructed to support a tri-level light board stack on each side or two light boards and a spacer board or one light board and two spacer boards. In this exemplary embodiment, however, the number of light boards in each light stack on the four-sided support tower 242 has increased from two to four versus the prior embodiment and with the additional of one more spacer boards 227, 229 for a total of two expansion slots.

As shown in FIG. 16A, a light board stack 224*a* on one side of the support tower 242 includes a lowermost light board 230*a* positioned under a lowermost spacer board 227, which is positioned under two adjacent intermediate light boards 230*b*, 230*c*, positioned under an uppermost spacer board 229, which is positioned under an uppermost light board 230*d* to complete the light stack 224*a*. As with the prior embodiment, one or more spacer boards 227, 229 may be replaced with a light board and connected to adjacent light boards to alter the wattage capacity of the modular light fixture assembly 242. As shown in FIG. 17, the lowermost spacer 227 has been replaced with a light board 230*e* to form another lighting tier level. Then, in FIG. 18, the second spacer board 229 has been replaced with yet another light board 230*f* to define another lighting tier level. As the light boards 230*a-f* in this exemplary embodiment 232 are the same as the light boards 130*a*, 130*b* in the prior modular light fixture assembly 232, the replacement, substitution, and connection process is the same. For example, in this exemplary embodiment, the modular fixture is expandable from a four lighting tier capacity of 800 W to a five lighting tier capacity of 1000 W to six lighting tier capacity of 1200 W with each light board having a 50 W capacity for each spacer board replaced by a light board. Such addition and subtraction of light boards or spacers illustrates the modular flexibility and wattage and related lumen capacity changes of the modular light fixture assembly.

Materials: Overall, the exemplary illumination system 30 described herein incorporates a modular light fixture assembly 32, an inflatable diffuser 34, and a mounting structure such as the exemplary tripod 36. The components of the modular light fixture are mainly composed of plastic, metal, and electrical wire. The inflatable diffuser is constructed of a suitable inflatable material allowing an amount of light therethrough and may include one or more airvents and may include a reflective region, especially at the top end. The tripod is constructed of metal, metal alloy, plastic material, or a combination thereof. The weight of the tripod may vary with the environment the illumination system is placed in.

The lamp boards preferably have a 50 W capacity wherein a single horizontal level or lighting tier of the four sided support tower 42 has a 200 W capacity while a dual level configuration has a 400 W capacity, although this is not meant to be limiting.

The connector cables connecting the lamp boards are preferably an IP65 type connector with the input ends being male and the output ends being female.

The LED driver is preferably an all-in-one device with separate cables for lighting output, dimming control, and fan power. One exemplary suitable LED driver device can drive from 50 W-1200 W and is available from SeeDevil Lighting & Power, Part No. SD-BLF-400/800-G3-10.

The fan is preferably a centrifugal fan that draws air up through the openings in the sponge pressing plate 48, on through the filtering sponge 50, through the lower housing 40 and on through the central aperture 106 in the lamp fixture mounting plate 104 to the interior region of the support tower 42 behind the interior facing surfaces of the heat sink plates of each lamp board. The airflow is further drawn up through the opening 162 in the fan mounting plate 160 into the fan 170 and then directly radially outwardly through the slots 180*a-d* in the fan protective shell 172 toward the laterally disposed interior surfaces of the inflatable diffuser 34 to initially inflate and maintain inflation of the diffuser while the fan is operating.

It will be appreciated that each side of the support tower 42 may include different light stack configurations. As one non-limiting example, one side of the support tower may include a light stack in the order of spacer board, lower light board, upper light board while an adjacent or opposing light stack may be in the order of lower light board, spacer board, upper light board. It will be appreciated that the light stacks will preferably be identical for consistent lighting effects, although other configurations may be useful to employ in certain lighting scenarios. For example, the light boards may have different lighting characteristics within the same light stack or same lighting tier but also may differ from one another within the same light stack or same lighting tier and also differ from adjacent or opposing light stacks or lighting tiers. It will further be appreciated that the spacer boards assist in sealing off the interior of the support tower 42, 242 to prevent dust and other debris from entering into the airstream passing therethrough.

Specific embodiments and applications of a modular light fixture that may be used with an inflatable balloon diffuser and suspended or otherwise supported from a mounting structure have been described herein. However, it should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Any objects cited herein may or may not be applicable to each embodiment and not all objects need be accomplished by any single embodiment.

What is claimed is:

1. A modular light fixture with at least two light boards comprising:

a support tower;

a base level lighting tier having at least one main light emitting board releasably secured to the support tower, the at least one main light emitting board defining a first brightness capacity;

at least one auxiliary level lighting tier having at least one auxiliary light emitting board releasably secured to the support tower, the light emitting boards being electrically coupled in series to define a second brightness capacity;

a driver unit configured to control the light emitting boards; and an auxiliary connector removably coupling the at least one main light emitting board of the base level lighting tier to the driver unit, wherein the driver unit is configured to be coupled to a power source to illuminate the light emitting boards.

2. The modular light fixture of claim 1 wherein:

the at least one main light emitting board of the base level lighting tier includes a primary connector releasably coupled to the auxiliary connector and at least one expansion connector for releasably coupling to at least one other light emitting board on another level lighting tier.

3. The modular light fixture of claim 1 further comprising:

at least one expansion level lighting tier having at least one placeholder blank releasably secured to the support tower with a first surface facing an interior of the support tower and a second surface facing an exterior of the support tower; and the connections between the light emitting boards of the base level lighting tier and the auxiliary level lighting tier are disposed behind the interior surface of the placeholder blank.

4. The modular light fixture of claim 1 wherein:

the light emitting boards include at least one LED array; and the driver unit includes at least one LED driver.

5. The modular light fixture of claim 1 wherein:

the driver unit is configured to be coupled to a power source to illuminate the light emitting boards connected electrically in series to the driver unit through the auxiliary connector.

6. The modular light fixture of claim 1 wherein:

at least one light emitting board includes a heat sink, a set of cooling fins projecting toward an interior space of the support tower, an LED array, and a primary power input connector constructed to removably connect to the auxiliary connector and a transfer connector being constructed to removably connect to a sequentially arranged primary input connector of another light emitting board.

7. The modular light fixture of claim 1 wherein:

the transfer connector of at least one light board may be disconnected from a first light board and connected to an alternative light board.

8. The modular light fixture of claim 1 further comprising:

a first expansion level lighting tier including a plurality of expansion light emitting boards vertically aligned with a corresponding plurality of base level lighting tier light emitting boards and a corresponding plurality of auxiliary level lighting tier light emitting boards, each light emitting board in the first expansion lighting tier including a first expansion connector removably coupled to an expansion connector in a counterpart light emitting board in at least one other level lighting tier to connect the light emitting boards in series.

9. The modular light fixture of claim 8 wherein:

the support tower includes a plurality of sides with each side including a light emitting board in the base level lighting tier, the auxiliary level lighting tier, and the first expansion level lighting tier all coupled in series and all vertically aligned on their respective sides.

10. The modular light fixture of claim 9 wherein:

the auxiliary connector includes a driver side connector for each side of the support tower for connecting to the light emitting board on each side of the base level lighting tier.

11. The modular light fixture of claim 1 further comprising:

at least one expansion level lighting tier having at least one placeholder blank releasably secured to the support tower, the placeholder blank being constructed to be swapped out with at least one expansion light emitting board to be coupled in series to at least one other light emitting board to alter the brightness capacity of the modular light fixture.

12. The modular light fixture of claim 11 wherein:

the at least one placeholder blank at least partially spans a gap between the light emitting boards in the base level lighting tier and the auxiliary level lighting tier.

13. The modular light fixture of claim 11 wherein:

the support tower includes a plurality of sides, the support tower having a set of spaced apart supporting pillars of a predetermined height defining an interior space formed by and separated from an exterior space by the supporting pillars with adjacent supporting pillars defining the sides of the support tower, the supporting pillars further having a lower end releasably coupled to a lower support plate and an upper end releasably coupled to an upper support plate with each of the pillars including a mounting surface for releasably receiving at least a portion of a light emitting board or a placeholder blank from each tier.

14. The modular light fixture of claim 13 further comprising:

a protective cage slipped over the support tower with a lower end abutting the lower support plate and an upper end releasably secured to the respective top ends of the support pillars;

a lower housing containing the driver unit and capped off with the lower support plate;

a fan unit resting atop the upper support plate;

a protective shell surrounding the top and sides of the fan unit, the protective shell including a plurality of slots along the radially outwardly projecting sides; and an inflatable diffuser having a lower end removably coupled to the lower housing and an upper end removably coupled to the upper end of the protective cage, the diffuser being configured to expand in response to air being pushed outwardly by the fan unit.

15. The modular light fixture of claim 14 further comprising:

a power switch at least partially contained within the lower housing with an operative component exposed on the lower exterior surface of the lower housing; and a dimming knob at least partially contained within the lower housing with an operative component exposed on the lower exterior surface of the lower housing.

16. The modular light fixture of claim 14 wherein:

the fan unit is a centrifugal fan.

17. The modular light fixture of claim 14 further comprising:

a filtering sponge abutting the lower exterior surface of a lower housing in communication with the lower support plate;

a press plate covering the filtering sponge;

the fan unit drawing exterior air through the press plate and the sponge, through a hole in the lower housing and on into the interior of the support tower and through a hole in the upper support plate and then expelling the air out through the radial slots in the protective housing to be directed against the interior surface of the inflatable diffuser to inflate the diffuser while the fan is powered on.

18. The modular light fixture of claim 14 further comprising:

a diffuser fixing plate secured to the top end of the protective cage, the diffuser fixing plate include a fastener receptacle constructed to secure the top end of the inflatable diffuser.

19. A modular light fixture with at least two light boards comprising:

a support tower having a plurality of sides defining a predetermined height, at least one support plate, a set of spaced apart supporting pillars projecting from the support plate with adjacent supporting pillars defining the sides of the support tower, and an interior space formed by and separated from an exterior space by the supporting pillars, each of the pillars including a mounting surface;

a base level lighting tier including at least one main light board releasably secured to the mounting surface of at least one of the support pillars, the at least one main light board including an outwardly facing light emitting panel, an interior facing primary power supply connector, and an interior facing transfer connector;

at least one auxiliary level lighting tier including at least one auxiliary light board releasably secured to the mounting surface of at least one of the support pillars, the at least one auxiliary light board including an outwardly facing light emitting panel and an interior facing primary power supply connector for connecting to an interior facing transfer connector of a light board in another tier;

at least one expansion level lighting tier including at least one expansion light board with an outwardly facing light emitting panel having a primary connector configured to releasably connect to the transfer connector of a light board in another level lighting tier and a transfer connector constructed to releasably connect to the primary connector in at least one other light board in another level lighting tier, such that a plurality of light boards on the same side of the support tower are electrically connected in series;

at least one gap formed along the height of the support tower and configured to accommodate the at least one expansion level lighting tier;

a driver unit configured to control the light boards; and an auxiliary connector removably coupling the primary connector of at least one light board in the base level lighting tier to the driver unit, wherein the driver unit is configured to be coupled to a power source to provide power to all the connected light boards.

20. A modular light fixture with at least two light boards comprising:

a light fixture body including a support tower with a plurality of sides having a predetermined height, a lower support plate, an upper support plate, a set of spaced apart support pillars held by the upper support plate, with adjacent pillars defining the sides, a mounting surface, and substantially delineating an exterior tower space from an interior tower space;

a base level lighting tier including a main light board on each side of the support tower, the base level light boards being releasably secured to the mounting surface on adjacent support pillars, the base level light boards combining to define a base level brightness capacity, the base level light boards including a heat sink, a set of cooling fins projecting into the interior space of the support tower, an LED array facing the exterior space, a primary power connector, and a transfer connector;

a second level lighting tier including a second level light board on each side of the support tower, the second level light boards being releasably secured to the mounting surface on adjacent support, the second level light boards being vertically aligned with their counterpart main level light boards in the base level lighting tier, and combining to define second level brightness capacity, the second level light boards having a second level primary power connector;

at least one expansion level light board having an expansion level primary connector configured to releasably connect to the transfer connector in a base level tier light board and an expansion level transfer connector to connect to a second level primary power connector;

at least one expansion level lighting tier along the height of the support tower configured to accommodate the expansion level light board;

a driver unit configured to control the lighting panels;

an auxiliary connector removably coupling the primary connector of at least one main light board in the base level lighting tier to the driver unit, wherein the driver unit is configured to be coupled to a power source to provide power to all the connected light boards, and the expansion level transfer connector connects to the second level primary power connector to electrically connect the base level lighting tier, the expansion level lighting tier, and the second level lighting tier in series;

a lower housing containing the driver unit and in communication with the lower support plate;

a fan unit disposed on the upper support plate;

a protective cage provided over the support tower and the fan unit and including an upper end spaced apart from a lower end resting on the lower support plate; and a diffuser at least partially surrounding the protective cage, and having a first end coupled to the lower housing and a second end coupled to the upper end of the protective cage, the diffuser configured to expand in response to air being pushed outwardly by the fan unit.

* * * * *